United States Patent [19]
Onishi et al.

[11] Patent Number: 5,210,748
[45] Date of Patent: May 11, 1993

[54] ADDRESS FILTER UNIT FOR CARRYING OUT ADDRESS FILTER PROCESSING AMONG PLURALITY OF NETWORKS AND METHOD THEREOF

[75] Inventors: Katsuyoshi Onishi, Yokohama; Osamu Takada, Sagamihara; Koichi Kimura, Yokohama; Mitsuhiro Yamaga, Kawasaki; Toshihiko Ogura, Ebina; Yasushi Shibata, Hadano, all of Japan

[73] Assignee: Hitachi, Ltd., Tokyo, Japan

[21] Appl. No.: 652,044

[22] Filed: Feb. 4, 1991

Related U.S. Application Data

[63] Continuation-in-part of Ser. No. 520,712, May 8, 1990.

[30] Foreign Application Priority Data

Feb. 9, 1990 [JP] Japan ................. 2-030942
Jun. 22, 1990 [JP] Japan ................. 2-165442

[51] Int. Cl.⁵ ............................................. H04J 3/08
[52] U.S. Cl. ............................... 370/85.13; 370/85.9; 370/60
[58] Field of Search ................ 370/85.13, 85.14, 85.7, 370/85.9, 95.1, 60

[56] References Cited

U.S. PATENT DOCUMENTS 4,933,937  6/1990  Konishi ..................... 370/85.13
4,975,906 12/1990  Takiyasu et al. ........... 370/85.13
4,996,524  2/1991  Tojima ..................... 370/85.13 X Primary Examiner—Douglas W. Olms
Assistant Examiner—Russell W. Blum
Attorney, Agent, or Firm—Fay, Sharpe, Beall, Fagan, Minnich & McKee

[57] ABSTRACT

The present invention relates to an address filter method and unit to be used in a bridge unit or the like for connecting networks. The address filter unit carries out an address filter processing between a plurality of networks by using address information extracted from an incoming information frame registered in an entry table. In order to improve the processing efficiency of the address filter processing, the address filter unit includes timers corresponding to each address information registration, timer updating means for sequentially and intermittently advancing each timer value, and means for deleting registration of the address information corresponding to the timers from the entry table when a timer value becomes equal to or above a predetermined value. Further, the address filtering method includes a first step for sequentially generating, as an address of the entry table, a function (fi(a), i=1 to n) of a source address extracted from an incoming information frame at the time of a registration in the entry table or a destination address (a) extracted from an incoming information frame at the time of a retrieval from the entry table, a second step for deciding whether or not address information can be registered in an address generated in the first step in the entry table, at the time of registration, and a third step for deciding whether or not address information registered in an address generated in the first step in the entry table is desired address information, at the time of retrieval.

21 Claims, 27 Drawing Sheets

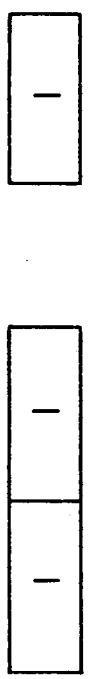
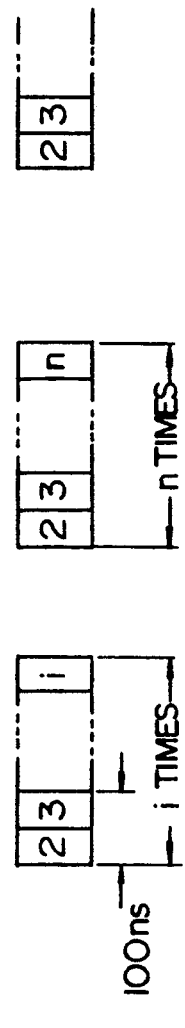
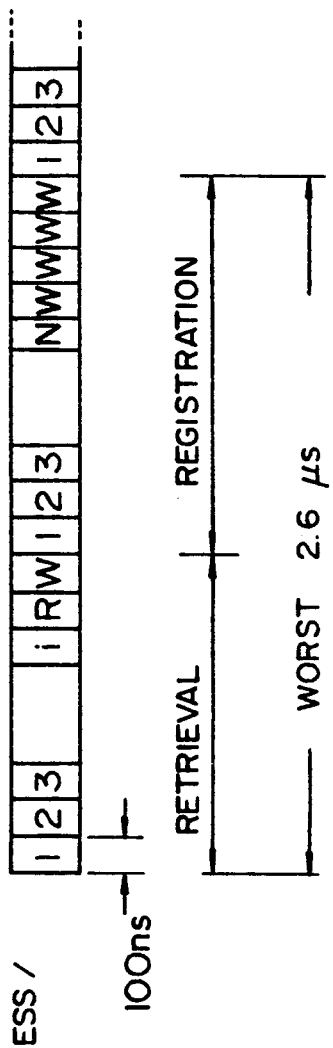
FIG. 10 a  hI GENERATION
FIG. 10 b  hi GENERATION
FIG. 10 c  MEMORY ACCESS / COINCIDENCE DECISION

| KEY (k) | ENTRY DATA (e) | TIMER (t) |
|---|---|---|
|  |  |  |
|  |  |  |

FIG. 25

| FUNCTION (f) | DO CONDITIONS | z (k, e, t) |
|---|---|---|
| HASH RETRIEVAL | do(k) ≠ di(k) | do |
|  | do(k) = di(k) | do, t = 0 |
| HASH REGISTRATION | do(k) = " " | di, t = 0 |
|  | do(k) ≠ di(k) | do |
|  | do(k) = di(k) | di, t = 0 |
| AGEING TIMER UPDATE | do(k) ≠ " " | do, t = t + 1 |
|  | do(k) = " " | do |
|  | do(t) = TIME-UP | " " |
| THROUGH | don't care | do | do : READ DATA     d : EXTERNAL DATA
z : WRITE DATA     " " : EMPTY DATA
k : KEY FIELD     e : ENTRY FIELD
t : TIMER FIELD

FIG. 26
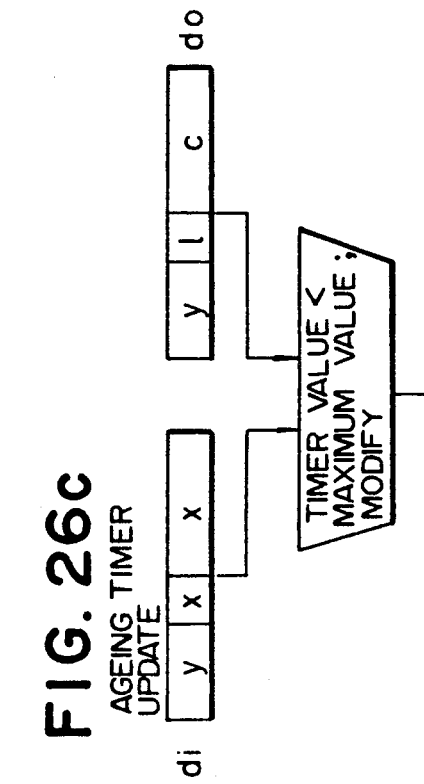
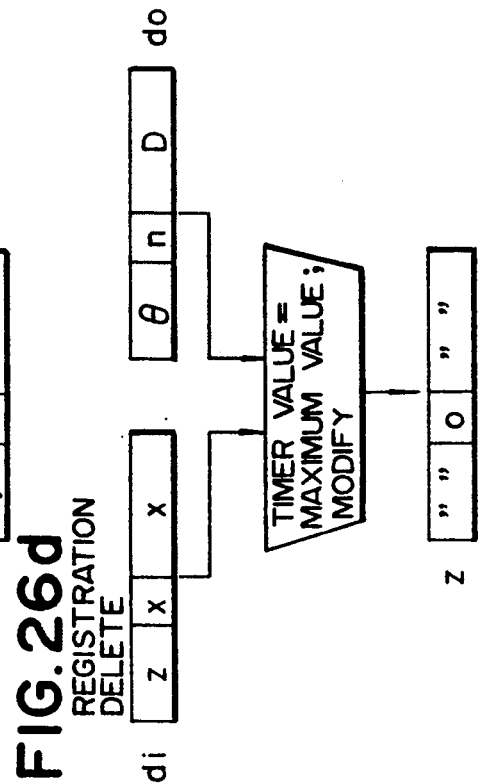
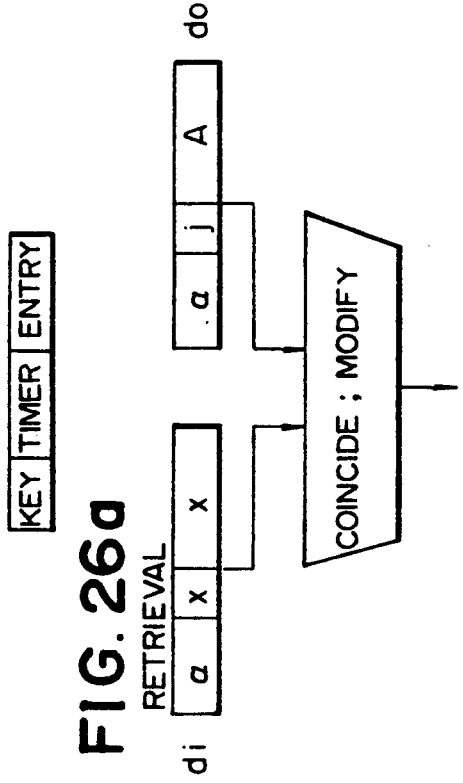
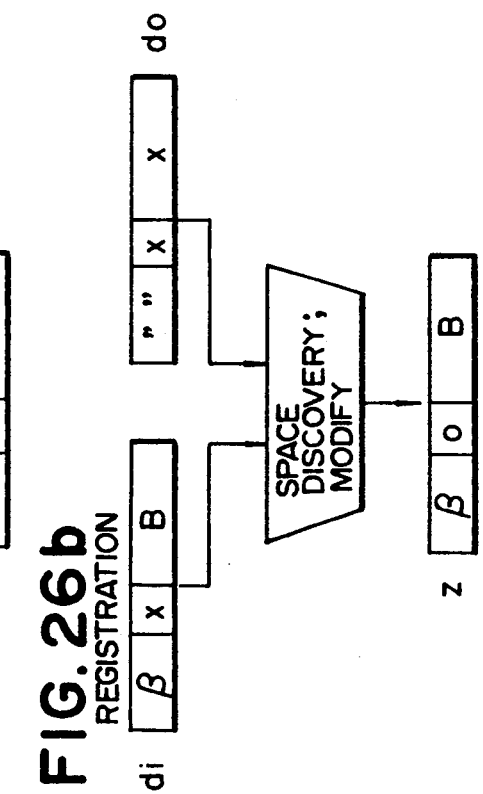

ADDRESS FILTER UNIT FOR CARRYING OUT ADDRESS FILTER PROCESSING AMONG PLURALITY OF NETWORKS AND METHOD THEREOF

CROSS-REFERENCE TO RELATED APPLICATION

This is a continuation-in part of copending U.S. application Ser. No. 520,712, filed May 8, 1990, the disclosure of which is hereby incorporated by reference.

BACKGROUND OF THE INVENTION

The present invention relates to an address filtering method and unit used in bridge unit or the like for connecting networks.

Relay processing of packets is usually carried out as follows.

A bridge unit comprises an entry table for storing a position at which a terminal is located. In carrying out relaying operation, the bridge unit refers to this entry table and a destination address of an incoming packet to decide whether the packet should be relayed or discarded, that is, the bridge unit carries out address filter processing.

To be more specific, when the destination terminal of the packet is in the a different LAN or when the destination of the packet is not known, the packet is relayed. When the packet is in the incoming direction, it is discarded.

Methods of dynamically learning contents of an entry table have been proposed. For example, a technique described in JP-A-64-39852 is known.

According to this technique, an incoming packet is referred to and its source address and its terminal position are registered in the entry table to carry out learning.

The entry table is reviewed periodically for the purpose of:

① preventing the table from being filled by the learning; and

② adjusting to movement of the terminal position, and deleting the registration of a terminal which has not been transmitting or receiving packets from the entry table.

SUMMARY OF THE INVENTION

According to the above-described prior art technique, however, periods are separated and the registration period of each terminal is stored by corresponding it to the contents of registration so that only those terminals which have been registered within the current period and within the preceding period are made effective and those registered before the preceding period are deleted. Registration of terminals which have not carried out transmission or receiving of packets are thus deleted. Therefore, contents of learning carried out during the period before the preceding period is deleted. As a result, at the starting time of each period, the number of entries of the entry table is insufficient so that there is a problem that the hit rate is reduced.

It is an object of the present invention to provide an address filtering method and unit which can prevent a table from becoming full by learning without reducing the hit rate and which can adjust to movement of move terminal position.

It is another object of the present invention to provide an address filtering method and unit which can improve processing efficiency of the address filter processing.

In order to achieve the above objects, the present invention provides an address filter unit for carrying out address filter processing among a plurality of networks by using address information extracted from an incoming information frame registered in an entry table. The address filter unit is made up of a timer provided to correspond to each address information registration, a timer updating unit for sequentially and intermittently progressing each timer value, and a unit for deleting registration from the entry table when its timer value becomes equal to or greater than a predetermined value.

Further, in order to achieve the above objects, the present invention provides an address filter unit for carrying out address filter processing among a plurality of networks by using address information extracted from an incoming information frame registered in an entry table. The address filter unit is made up of a timer provided to correspond to each address information registration, a timer updating unit for sequentially and intermittently progressing each timer value, a starting unit for starting the timer updating unit at a constant cycle $\Delta T$, and a unit for deleting registration from the entry table when is timer value becomes equal to or greater than a predetermined value.

Further, the present invention provides an address filtering method for carrying out address filter processing among a plurality of networks by retrieving address information extracted from an incoming information frame registered in an entry table. The address filtering method is comprised of a first step or sequentially generating an address of the entry table as a function (fi(a), i=1 to n) of a destination address (a) extracted from an incoming information frame at the time of retrieving a source address or the entry table extracted from an incoming information frame at the time of registering in the entry table, a second step for making decision about whether address information is to be registered in the address of the entry table generated in the first step, and a third step for making decision about whether the address information registered in the address of the entry table generated in the first step is desired address information.

Further, the present invention provides an address filtering unit for carrying out an address filter among branch line LAN and trunk line network comprising N (N≧1) logical transmission paths or physical transmission paths by retrieving address information extracted from an incoming information frame registered in an entry table thereby improving processing efficiency of address filter processing. The address filter unit is comprised of a priority order decision unit for deciding priority order for executing registration of address information incoming from a branch line LAN in the entry table, registration of address information incoming from N transmission paths of a trunk network into the entry table and retrieval of address information from the entry table. The address filter unit also contains an execution unit for executing the processing based on the result of a decision.

Further, in order to achieve the above-described objects, the present invention provides an address filter unit for carrying out an address filter processing among branch line LAN and trunk line networks comprising N (N≧1) logical transmission paths or physical transmission paths by retrieving address information registered in an entry table thereby improving processing efficiency of the address filter processing. The address filter unit is comprised of a priority order decision unit for deciding priority order for executing registration of address information incoming from a branch line LAN in the entry table, registration of address information incoming from N transmission paths of a trunk network into the entry table and retrieval of address information from the entry table. The address filter unit also contains an address generation unit for sequentially generating an address of the entry table as a function (fi(a), i=1 to n) of a source address extracted from an incoming information frame at the time of registration or a destination address (a) extracted from an incoming information frame at the time of retrieval from the entry table, a registration address candidate decision unit for deciding a registration address among addresses sequentially generated by the address generation unit at the time of registration, a retrieval unit for retrieving desired address information from the address generated by the address generation unit in the entry table, and a unit for parallel operating a processing for generating an i-th address by the address generation unit, a processing for retrieving a (i−1)th address by a retrieval unit or a processing for deciding the (i−1)th address by the registration address candidate decision unit.

Further, in order to achieve the above-described objects, the present invention provides a memory circuit constituted by a memory, a comparison section for deciding a data generation mode based on data inputted from the outside and data read out from the memory, a data processing section for generating data to be written in the address into which data has been read from the memory in accordance with the data generation mode decided by the comparison section, and an address generation section for sequentially generating an address in accordance with a predetermined rule until a condition to be determined from a relationship between inputted data and read-out data becomes one of predetermined conditions not less than 1 and for reading out data from the memory.

BRIEF DESCRIPTION OF THE DRAWINGS

FIG. 10(a–e) are a timing diagram showing the pipeline operation of the hash circuit;

FIG. 25 is an explanatory diagram showing the operation principle of the storage circuit;

FIG. 26 (a–d) are an explanatory diagram showing an example of modification processing of the memory data;

DESCRIPTION OF THE PREFERRED EMBODIMENTS

A bridge unit in one embodiment of the present invention will be described below.

The network system using the bridge unit relating to the present embodiment will be explained first.

Figure 1:
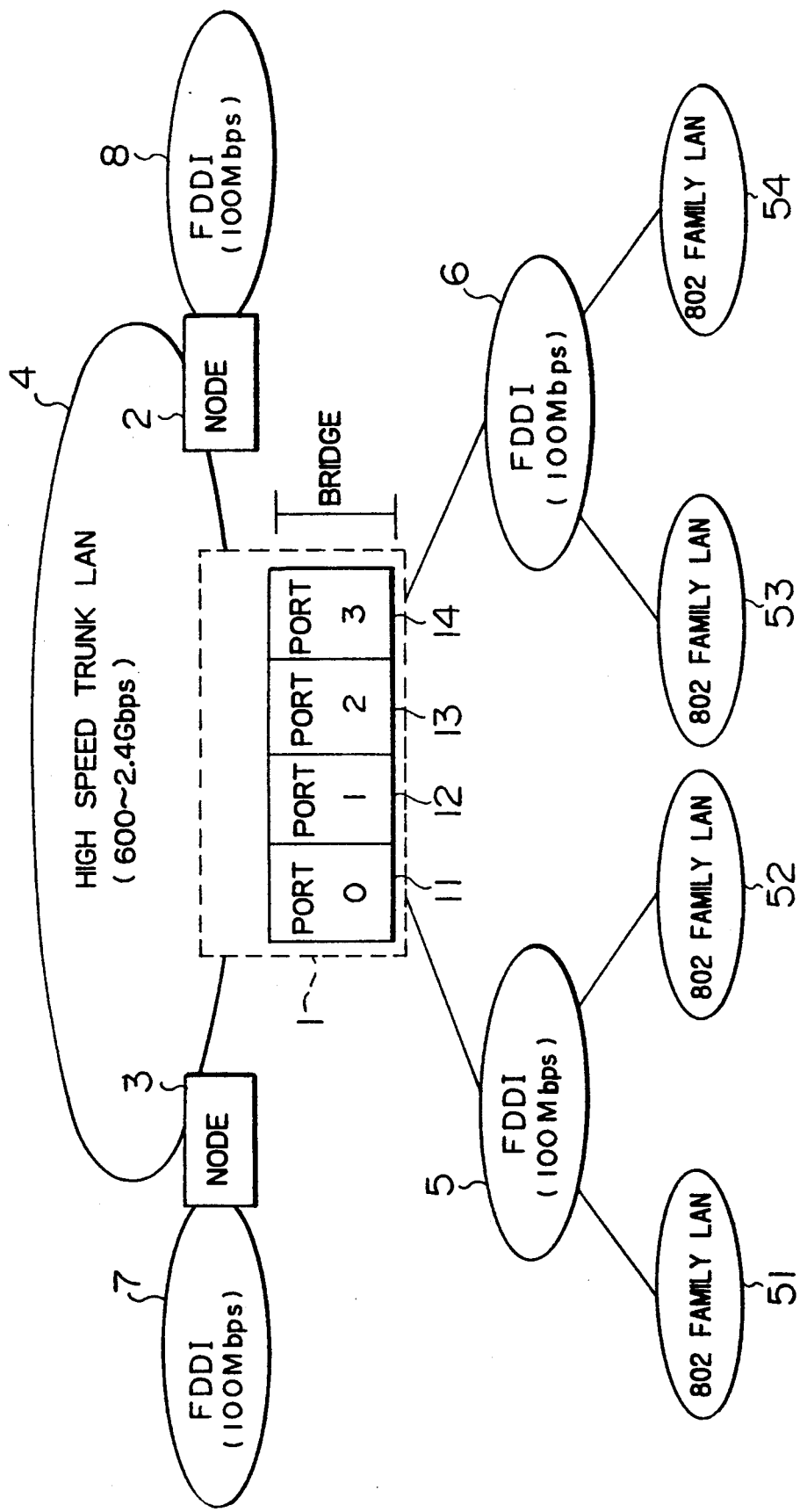
FIG. 1 is a system configuration diagram showing the configuration of a network system to which the present invention is applied.

FIG. 1 shows the configuration of the network system.

Figure 2:
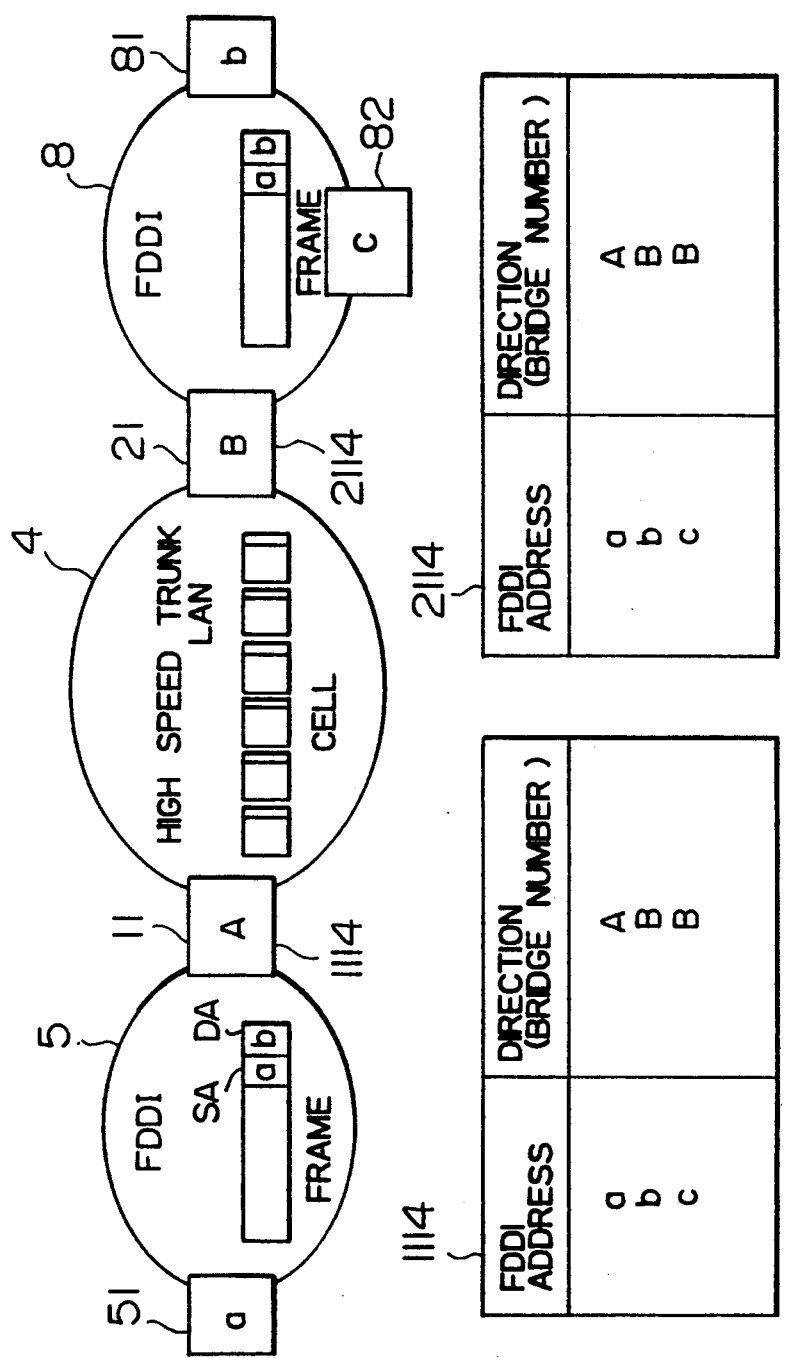
FIG. 2 is an explanatory diagram showing the outline of frame trunking.
Figure 3:
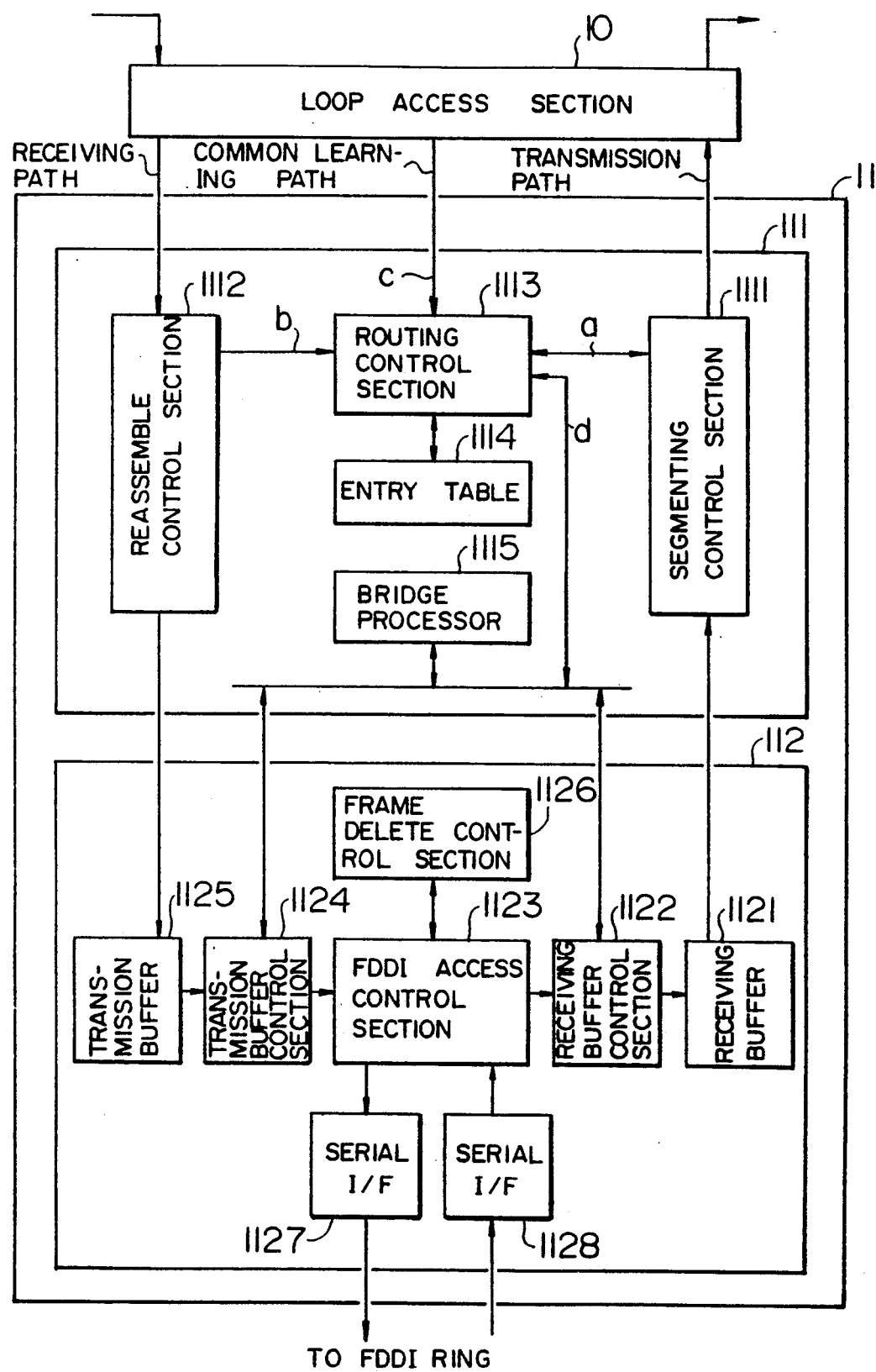
FIG. 3 is a block diagram showing the configuration of a bridge unit.

In FIG. 1, 1 to 3 designate nodes connected to a high speed trunk local area network (LAN) 4 (600 Mbps to 2.4 Gbps, 150 Mbps ×4 to 16 multiplex), and 5 to 8 designate fiber distributed data interfaces (FDDI) for accommodating, for example, 802 family LAN. The node 1 accommodates up to four ports by using bridge units 11 to 14 as ports.

Regarding the bridge units, a bridge unit 11, for example, connects the FDDI 5 and the high speed trunk LAN 4.

The FDDI 5 connects 802 family LANs 51 and 52. In other words, the network system relating to the present embodiment comprises three hierarchies of LANs. In this case, the whole of the 802 family LANs 51 and 52 and the FDDI 5 is regarded as a branch LAN for the bridge unit 11. When the 802 family LANs are directly connected to the bridge unit 11, these connected LANs are regarded as branch LANs.

The bridge units 11 to 14 decide whether frames received from the FDDIs are to be discarded or relayed. For the frames to be relayed, the bridge units 11 to 14 convert those frames into a data format of the high speed trunk LAN 4 (segmenting processing) and transmit the result. The bridge units 11 to 14 reconvert data received from the high speed trunk LAN 4 into an original data format by (reassemble processing) and transmit the result (hereinafter referred to as a routing processing).

The outline of the routing processing will be explained below based on the bridge unit 11 for connecting the high speed trunk LAN 4 and the FDDI 5.

The high speed trunk LAN 4 employs a fixed-length cell system using a transmission mode of a broadband ISDN corresponding to multi-media transmission and employs statistical multiplex using cells of a required number corresponding to the quantity of information, thereby realizing hypercomplex multiplexing of information from slow access to rapid access.

FIG. 2 shows a flow of a frame from the FDDI 5 to the FDDI 8 through the high speed trunk LAN 4.

The bridge units 11 and 21 store positions of the FDDI nodes in entry tables 1114 and 2114 (learning) and carry out routing processing by referring to the stored positions.

The entry tables 1114 and 2114 express directions in which the FDDI nodes exist using bridge unit numbers of the high speed trunk LAN 4. In the present embodiment, bridge unit numbers A and B are allocated to the bridge units 11 and 21, respectively.

By the above arrangement, the entry of the bridge unit 11 comprise pairs of FDDI medium access control (MAC) addresses and bridge unit numbers.

The bridge unit 11 converts a frame received from the FDDI 5 into cells of a transmission data format of the high speed trunk LAN 4 (segmenting processing).

More specifically, the bridge unit 11 disassembles a received frame into a fixed-length cell unit, adds a header comprising a source bridge unit number, and destination bridge unit number, etc. to the cell unit and transmits the result to the high speed trunk LAN 4.

A destination bridge unit 21(B) is a bridge unit having a destination FDDI node 81(b) under its control, which address is obtained by referring to the entry table 2114 using the destination FDDI MAC address as a key.

On the other hand, the receiving bridge unit 21 receives cells transmitted to this bridge unit, reassembles the cells into a frame (reassembling processing), and relays the result to the FDDI 8 under its control.

The above routing information (the FDDI MAC address and the bridge unit number) is learned as follows.

The transmitting bridge unit 11 registers as a pair the source address (a) and the own bridge unit number (A) of the frame received from the FDDI 5, in the entry table 1114.

The receiving bridge unit 21 registers in the entry table 2114, as a pair, the source address (a) and the transmitting bridge unit number (A) based on the cells received from the high speed LAN 4.

In the present embodiment, the entries in the entry tables 1114 and 2114 are deleted by the ageing timer based on the regulation of the IEEE 802.1 (range: 10 to $10^6$ sec).

Details of the bridge unit and details of the routing processing will be explained next.

FIG. 3 shows the configuration of the bridge unit 11.

In FIG. 3, 10 designates a high speed trunk LAN loop access section which belongs to the node. 11 designates a bridge unit, 111 a relay control section and 112 an FDDI control section. 1111 designates a segmenting control section which disassembles the frame that has been received by the FDDI control section 112 from the FDDI ring into cells and transmits the cells to the high speed trunk LAN 4. 1112 designates a reassemble control section which assembles the cells that have been received from the loop access section 10 into a frame and transmits the frame to the FDDI control section 112. 1113 designates a routing control section which learns the position of the station and filters the trunk frame. 1114 designates an entry table.

In order to carry out relaying in the bridge unit, a data format conversion between the FDDI and the high speed trunk LAN 4 is carried out as shown in FIG. 2.

Description will first be made of the segment processing for disassembling the FDDI frame into cells and the reassemble processing for reassembling the cells into the original frame.

Figure 4:
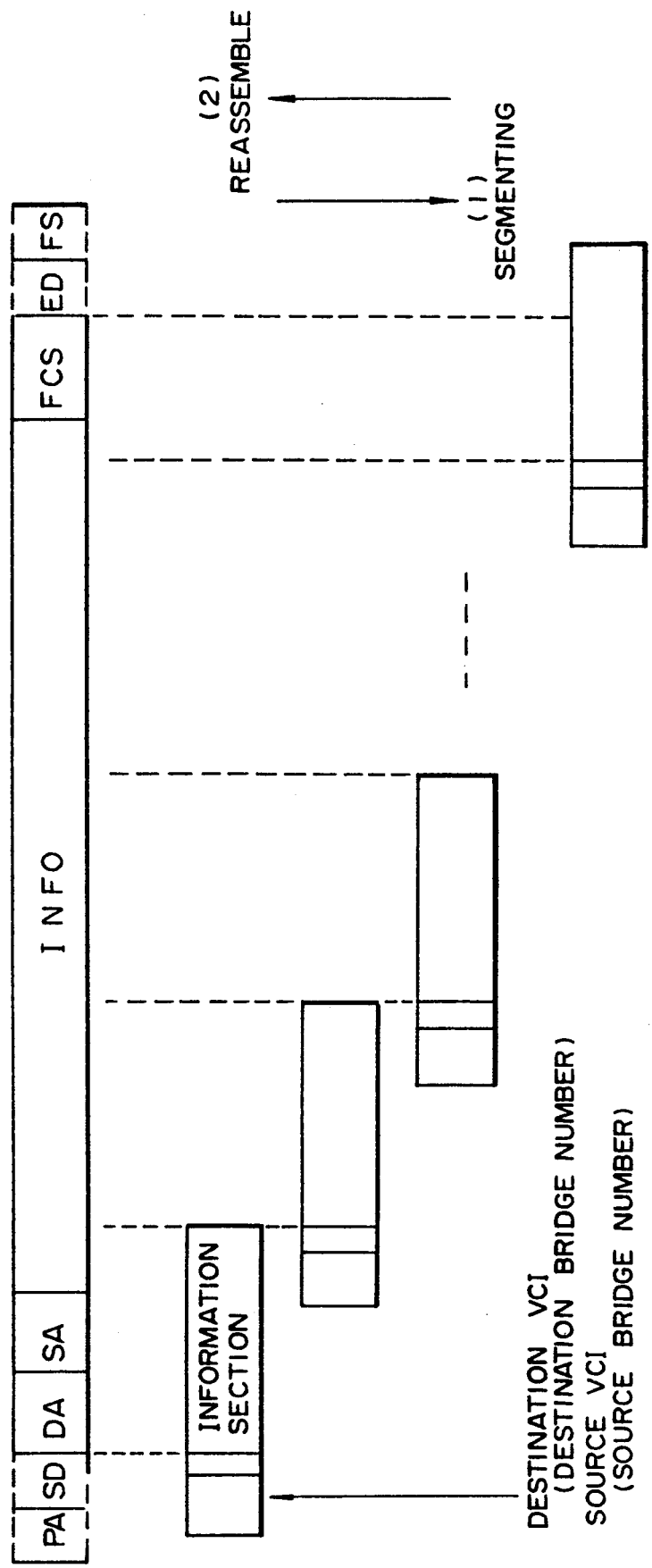
FIG. 4 is an explanatory diagram showing the outline of segmenting and reassembling processings.

The segmenting control section 1111 disassembles the received FDDI frame stored in a receiving buffer 1121 into cells (FIG. 4(1)) and delivers the cells to the loop access section 10.

Figure 5:
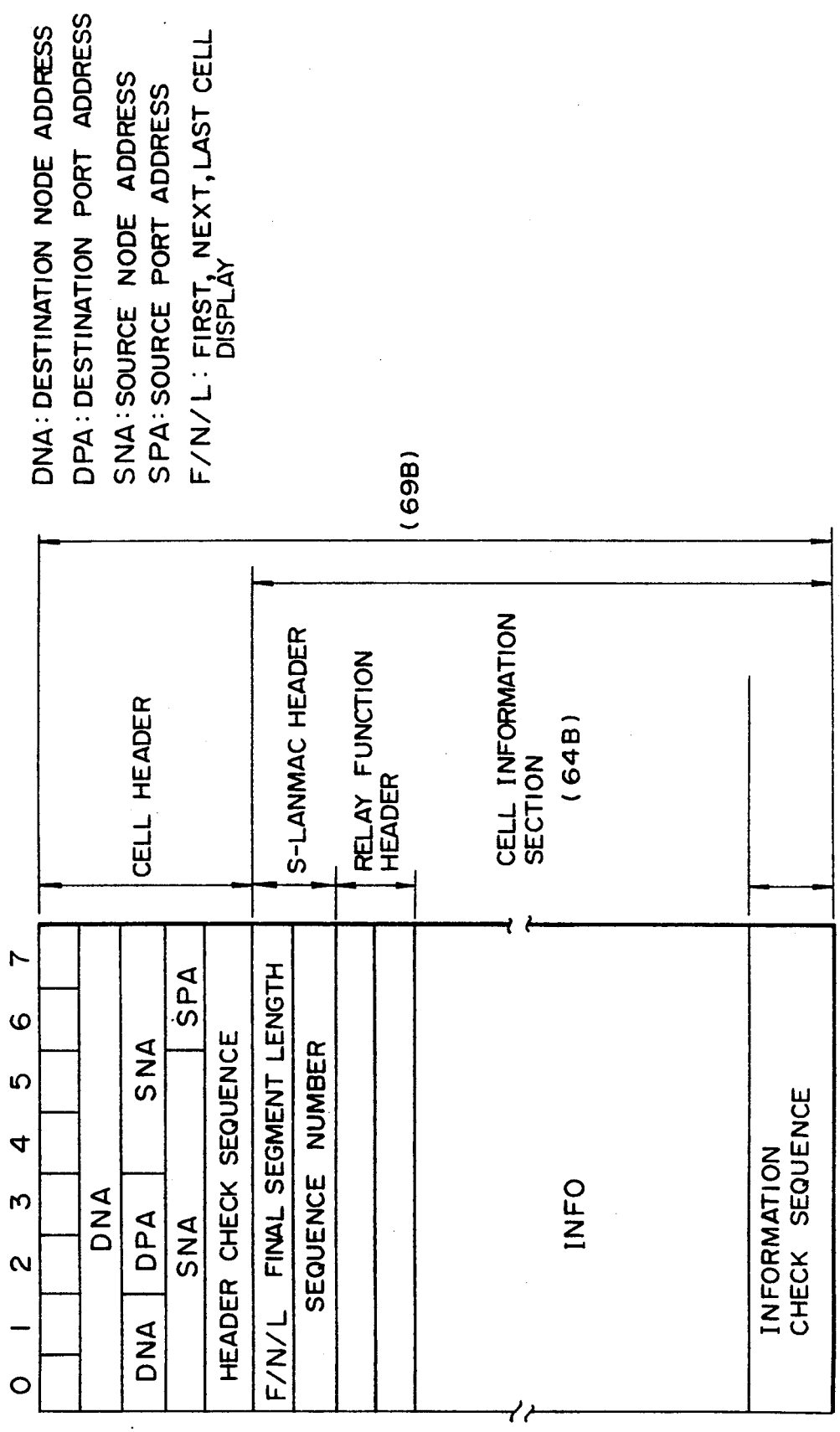
FIG. 5 is an explanatory diagram showing the configuration of a cell.

In the segment processing, a cell header including a destination virtual channel identifier (VCI) and a source VCI is added to one cell unit to constitute cells as shown in FIG. 5. The VCI represents the above-described bridge unit number and comprises the node address and the port (bridge unit) address. The destination VCI for accommodating the destination terminal is obtained from the entry table 1114.

In the mean time, the reassemble control section 1112 reassembles the cell units into the original frame in the receiving bridge unit (FIG. 4(2)). The reassembled frame is transmitted to a transmission buffer 1125 of the FDDI control section 112.

Description will now be made of the decision to relay/discard and the routing processing for transmitting cells to the bridge unit which accommodates the destination terminal.

The segmenting control section 1111 receives the frame, accesses the entry table 1114 under the control of the routing control section 1113 by using the destination MAC address (DA) as a key, and obtains the VCI (destination VCI) which accommodates the entry table 1114.

Based on the result of the above processing, relay or discard is decided as follows.

① When the destination VCI is equal to the source VCI, the DA is under the control of the same bridge unit. Therefore, the frame is not transmitted to the high speed LAN but it is discarded.

② When the destination VCI is not equal to the source VCI, the DA is under the control of another bridge unit. Therefore, the frame is relayed to the bridge on the high speed LAN.

③ When the VCI is not found, the frame is broadcast-relayed to all the bridge units on the high speed LAN so that the relayed frame is passed to all the FDDIs. Accordingly, this frame is relayed by all the other bridge units to the FDDIs to which these bridge units are connected. As a result, the frame can reach the targeted destination node.

The bridging unit relating to the present embodiment does not carry out filtering in the downward direction. The bridge unit which has received cells that were broadcast-relayed by the transmitting bridge unit or that were transmitted by designating the destination VCI reassembles all the cells that have been received and relays the result to the FDDI connected to the bridge unit.

Since the bridge unit which transmits the cells judges the position of the destination node and transmits the cells to the bridge unit that is designated to receive the cells in that direction, it is apparent that there exists a destination node under the control of the receiving bridge unit. Further, since only one FDDI is connected to the bridge unit, it is also apparent that the destination node exists in this FDDI.

The bridge unit of the embodiment learns from all the cells including ones which are destined to a different bridge unit. This means that any bridge unit which is connected to the trunk line LAN should have the same entry table.

The reason why no downward-direction filtering is required was already explained above for the case of receiving cells whose destinations are known. Now, based on the above premise that any bridge unit has the same entry table, the case of broadcasting cells whose destinations are not known is considered here. The source bridge unit does not know the destination. Therefore in the case where broadcast-relaying is effected for all the bridge units, it can be known without retrieving or checking the entry tables that no bridge unit knows the destination. Thus, no downward filtering is required.

Description will next be made of the learning or the process for storing information of the terminal position. The bridge unit relating to the present embodiment carries out learning from two directions, that is, from the frame received by the FDDI and from the cells received from the high speed trunk LAN 4.

The learning from the upward direction is carried out by the segmenting control section through the registration of the source MAC address (SA) positioned in the front section of the frame and the source VCI into the entry table 1114 under the control of the routing control section 1113 when the segmenting control section carries out the segmenting. By this arrangement, the bridge unit learns the position of the terminal under its control. The route of this learning is shown by the path a in FIG. 3.

The learning from the downward direction is carried out from the cells transmitted to the same bridge unit and from all the cells transmitted to the other bridge unit. This route is shown by the receiving path (FIG. 3b) and the common learning path (FIG. 3c).

Among a series of cells segmented from the frame by the transmitting bridge unit, only the first cell includes the SA. Therefore, the bridge unit learns from this first cell. This learning is carried out by the reassemble control section 1112 through the registration of the SA within the information section of the first cell and the source VCI of the cell header section into the entry table 1114 under the control of the routing control section 1113.

For the purpose of improving learning efficiency, the learning from the common learning path (the path in FIG. 3c) enables learning from ells which are transmitted to the other bridge unit as well as from cells transmitted to the same bridge unit.

The transmission path of the high speed trunk LAN 4 comprises N (N=4 to 16) logical highways of 150 Mbps. The loop access section 10 collects all of these highways and transmits the cell (the first cell) including learning information to all the bridge units that are loaded to the source node (a maximum of four ports can be loaded). Each of the bridge units 11 to 14 receives the cell and registers the cell in the entry table in the same manner as the learning from the cells received by the source bridge unit.

Figure 6:
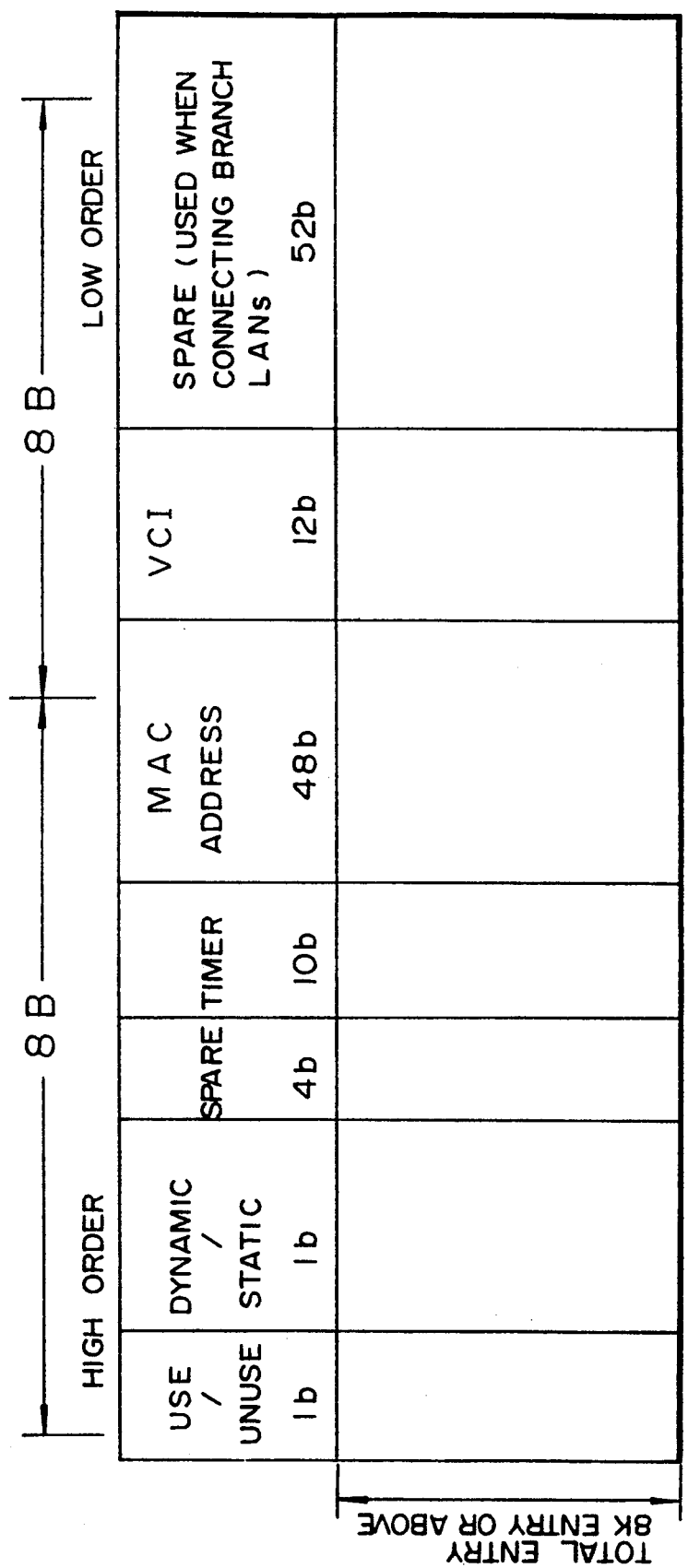
FIG. 6 is an explanatory diagram showing the configuration of an entry table.

Details of the entry table 1114 will be explained next. FIG. 6 shows the structure of the entry table 1114.

As shown in FIG. 6, an entry is registered by writing 48 bits of the MAC address 12 bits of the VCIs and indicating the "use" in the use/unuse display.

The position of writing the entry is generated by using the hash function having strong random mapping and by using the MAC address as a key.

The entry is deleted by time-out of the ageing timer. The deletion is carried out by updating the indication of "use" to the indication of "unuse".

There is also provided a static entry which is registered or deleted by the bridge unit processor 1115 and which is deleted by the ageing timer.

The bridge unit processor 1115, for example, registers the source station FDDIMAC address as a static entry in advance in the entry table 1114. In other words, the static entry is used when it is not usually possible to learn from the source address of the frame transmitted from the source station to the FDDI ring although the same bridge unit also has the FDDIMAC address.

The entry position is determined by the hash function for the following reason.

A capacity is required in the entry table to fixedly allocate entry of 48 bits of the MAC address.

Accordingly, it becomes necessary to compress the entry position to be determined by the 48 bits of the MAC address, for example, to about 16 bits (64 kilo entry). In order to reduce the probability that different MAC do not collide with the same entry, a function which is strong in randomness of evenly dispersing in the area of 16 bits is needed.

When the hash function is used, if a new entry is registered by assuming an entry using rate $\rho$ The probability that the MAC addresses collide with the registered entry is $\rho$. The probability that registration can be made at the n-th time after making collision by $(n-1)$ times is $\rho^{n-1} \times (1-\rho)$. For example, when $\rho = 50\%$, the probability that registration can be made by the 10th time is 99.9%.

In order to enable high speed retrieval/ registration, a hash function is realized by hardware.

Figure 7:
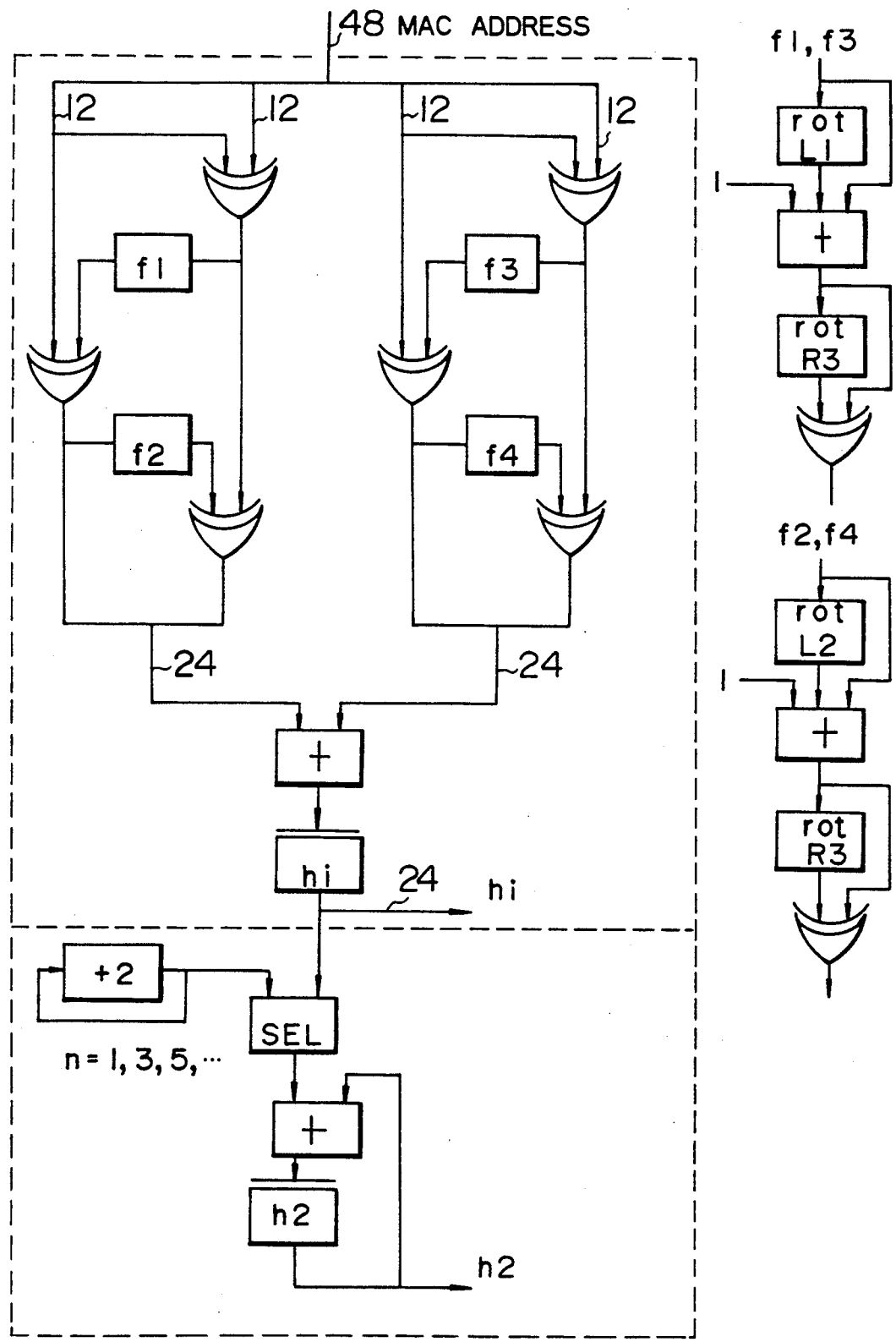
FIG. 7 is a circuit diagram of a hash circuit.

FIG. 7 shows the configuration of the hardware.

As shown in FIG. 7, the hash function is assumed to be the one which can be easily made by simple circuits of FX-OR, addition and rotation.

Candidate positions of entry registration by the hash generation are determined by the following discrimination method by carrying out hashing n times (for example, 10 times) with the corresponding MAC address as a key:

① when an unused entry is found, registration in this entry is possible

② when a registered entry is found by the corresponding MAC address, registration in this entry is possible, and ③ when a candidate of ① or ② is not found after having carried out hashing n times, a new entry is registered with priority. Accordingly, data is written in the entry of the oldest timer value.

On the other hand, the MAC address is retreived by using the same hash function with the corresponding MAC address as a key.

Next, description will be made about the routing control section for realizing a registration processing of the entry in the entry table 1114 and a retrieval processing of the entry from the entry table 1114.

Figure 8:
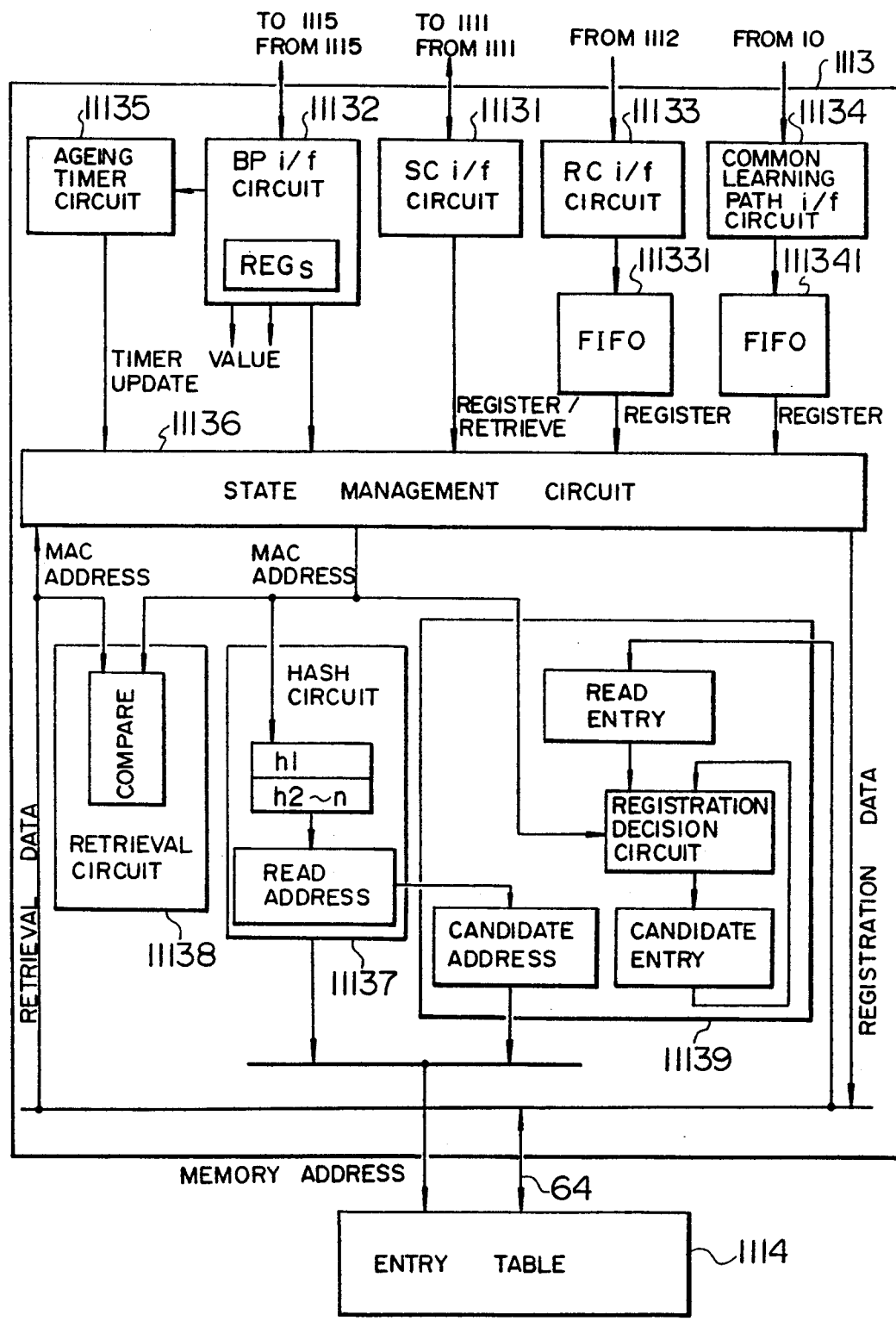
FIG. 8 is a block diagram showing the configuration of a routing control section relating to a first embodiment of the present invention.

FIG. 8 shows the configuration of the routing control section 1113 shown in FIG. 3.

Referring to FIG. 8, 11131 to 11134 designate interface circuits for carrying out an interface with the segmenting control section 1111, the bridge processor 1115, the reassemble control section 1112 and the common learning path c, respectively. 11135 designates an ageing timer circuit, 11136 a state management circuit for carrying out state management and access control of the entry table in accordance with the state, 11137 a hash sub circuit for generating a hash string from the MAC address of 48 bits and obtaining the entry position within the entry table 1114, 11138 a retrieval circuit for realizing the filtering function, and 11139 a registration circuit for realizing the learning function.

In the routing control section 1113, filter processings including an ageing timer value update processing, a segmenting retrieval processing, a segment registration processing, a receiving path registration processing and a common learning path registration processing, and a learning processing are integrated.

Accordingly, the above processings are carried out in accordance with the following priority order.

① In order to improve the performance of the relay processing, the highest priority is placed on the filtering of the upward direction.

② Among broadcasting due to unknown destinations, the most useless traffic is the communications among terminals under the control of the same bridge unit. Therefore, in order to avoid this, a higher priority is placed in the learning from the received FDDI frame under the control of the same bridge unit than in other learnings.

③ A low priority is placed on the learning from the learning path and the common learning path. Registration data is temporarily held in the FIFO 111331 and 111341 until there occurs some spare time in the processing. Filtering and learning frequency is one respectively for each frame, or one for eight cells on average. Therefore, spare time occurs even if a priority is placed in the processings of ① and ②. Accordingly, the present processing can be carried out in this spare time. Updating of the ageing timer value corresponding to each entry is intermittently carried out for each entry so as not to interrupt the other processings for a long time. Accordingly, since the interval for the updating of the ageing timer value becomes long and the time required for this processing is short, the highest priority is placed in this processing.

Figure 9:
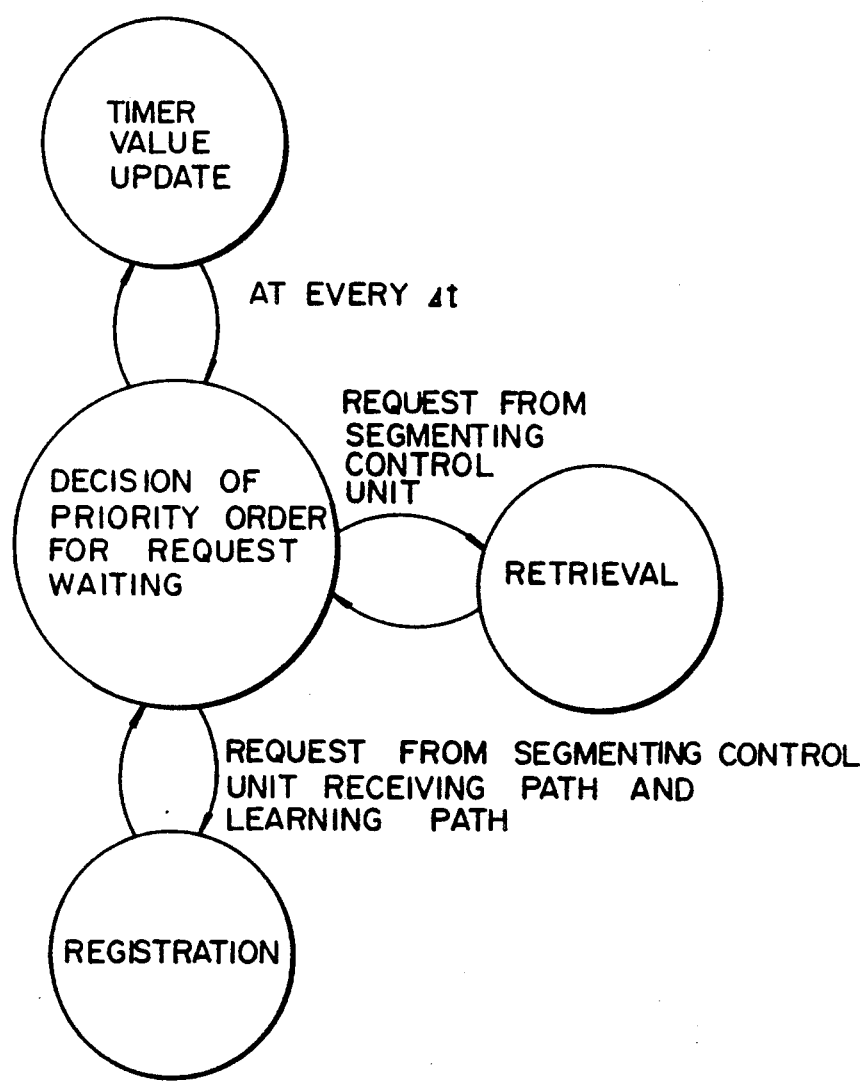
FIG. 9 is a state change diagram showing the operation of the routing control section.

FIG. 9 shows the state change of the routing control section 1113.

As shown in FIG. 9, the routing control section 113 has the following three functions:
① ageing timer value update processing
② retrieval processing
③ registration processing.

The state management circuit 11136 decides priority order based on requests from the interface circuits 11131 to 11134 the other control sections that can happen simultaneously, or the ageing timer circuit 1135. The state management circuit 11136 then manages the state of the routing control section, controls the state and makes access to the entry table 1114 to realize the above function.

The access address at the time of retrieval and registration in the entry table 1114 is generated by the hash circuit 1137 by using the MAC address as a key. Memory read and memory write is carried out in eight-byte units and four-byte units, respectively.

The operation of the hash sub circuit 11137 will be explained below.

As an example, description will be made of the operation of the hash circuit 11137 when there has been a request of retrieval/registration from the segmenting control section 1111.

FIG. 10 shows the timing of the retrieval/ registration processing.

In FIG. 10, the operation of (a) the generation of the first hash function h1, (b) the generation of the re-hash function h2 to hn and (c) the memory access is carried out by pipe-line processing as shown in the drawing.

In other words, the memory access/coincidence discrimination of hi and the generation of the next hash string hi+1 are carried out in parallel. When the generation of h2 is started, the generation of the next request h1 is started.

Figure 11:
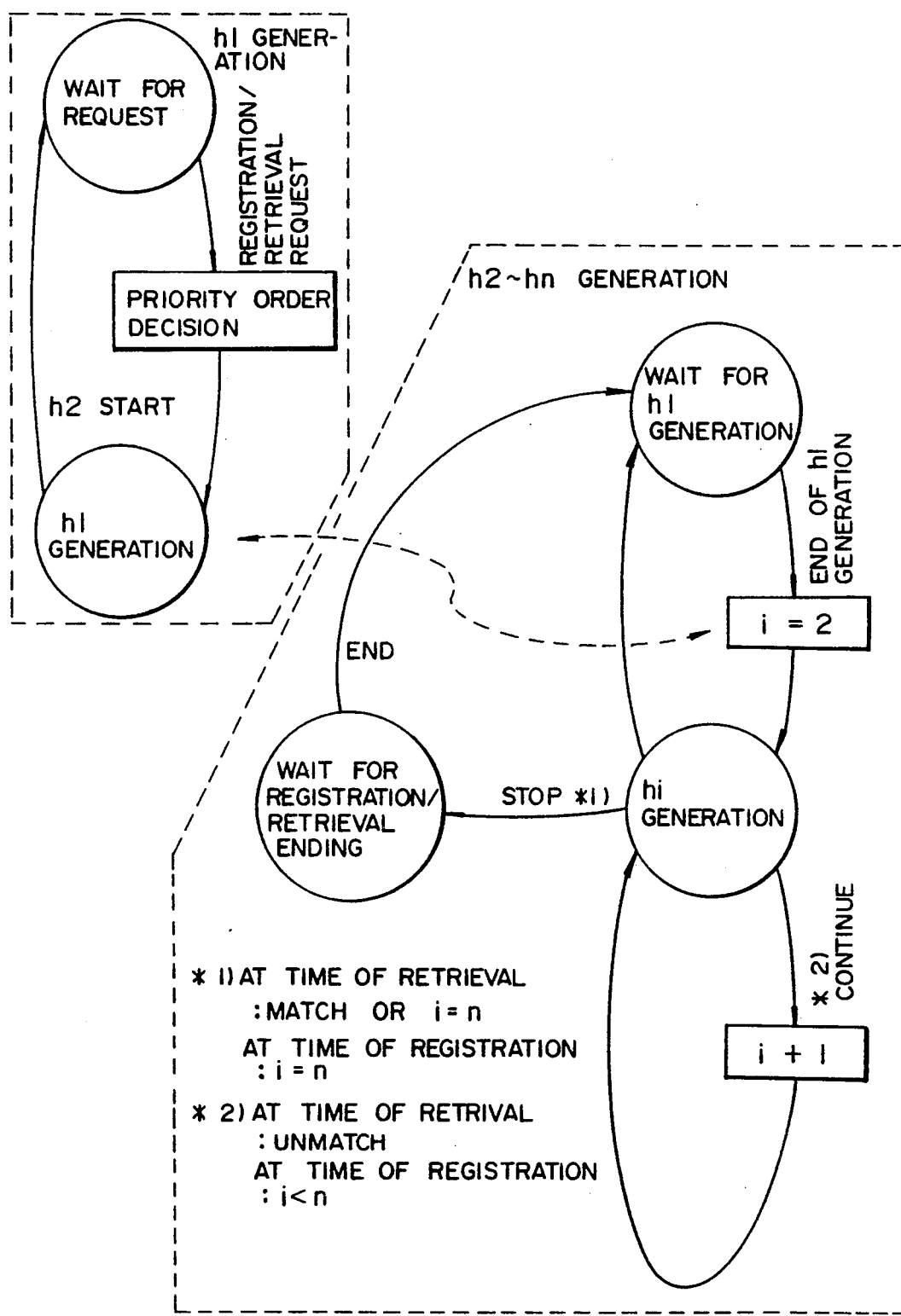
FIG. 11 is a state change diagram showing the operation of the hash circuit.

FIG. 11 shows the status change diagram of the hash circuit.

Description will be made starting with the generation of h1.

When there is a request for retrieval or registration from any one of the interface circuits 11131 to 11134 in the request wait state, the MAC address is read from the corresponding interface circuit based on the result of the priority order discrimination by the state management circuit 11136 and h1 is generated by using this MAC address as a key.

Generation of the next request h1 indicated from the state management circuit 11136 is awaited until the generation of h2 in the current processing is started.

Generation of h2 to hn will be explained next.

When the generation of h1 has been completed, h2 is generated based on h1, and h3 and above are generated sequentially. In the mean time, during the generation of hi, the entry of hi−1 is accessed in parallel.

The hi generation processing is terminated in the following condition.

In the case of retrieval, the hi generation processing is terminated when the retrieved circuit 11138 has found a desired MAC address or when the maximum hash hn (10 times) has been reached.

In the case of registration, the hi generation processing is terminated when candidates of registration entry have been determined by the registration circuit 11139 in accordance with the algorithm for determining candidate. A maximum hash hn is searched to determine candidates.

Upon termination of a retrieval by the retrieval circuit 11138 or a registration by the registration circuit 11139, the hash sub circuit 1137 starts generation of the next h2 if generation of the next h1 has been completed.

Description will next be made of the retrieval processing and the registration processing using the access address generated by the above hash sub circuit 1137.

The retrieval processing will be explained first.

The retrieval processing is carried out by the retrieval circuit 11138. For the retrieval processing, there is a request from the segmenting control section 1111 and a request from the bridge processor 1115.

Figure 12:
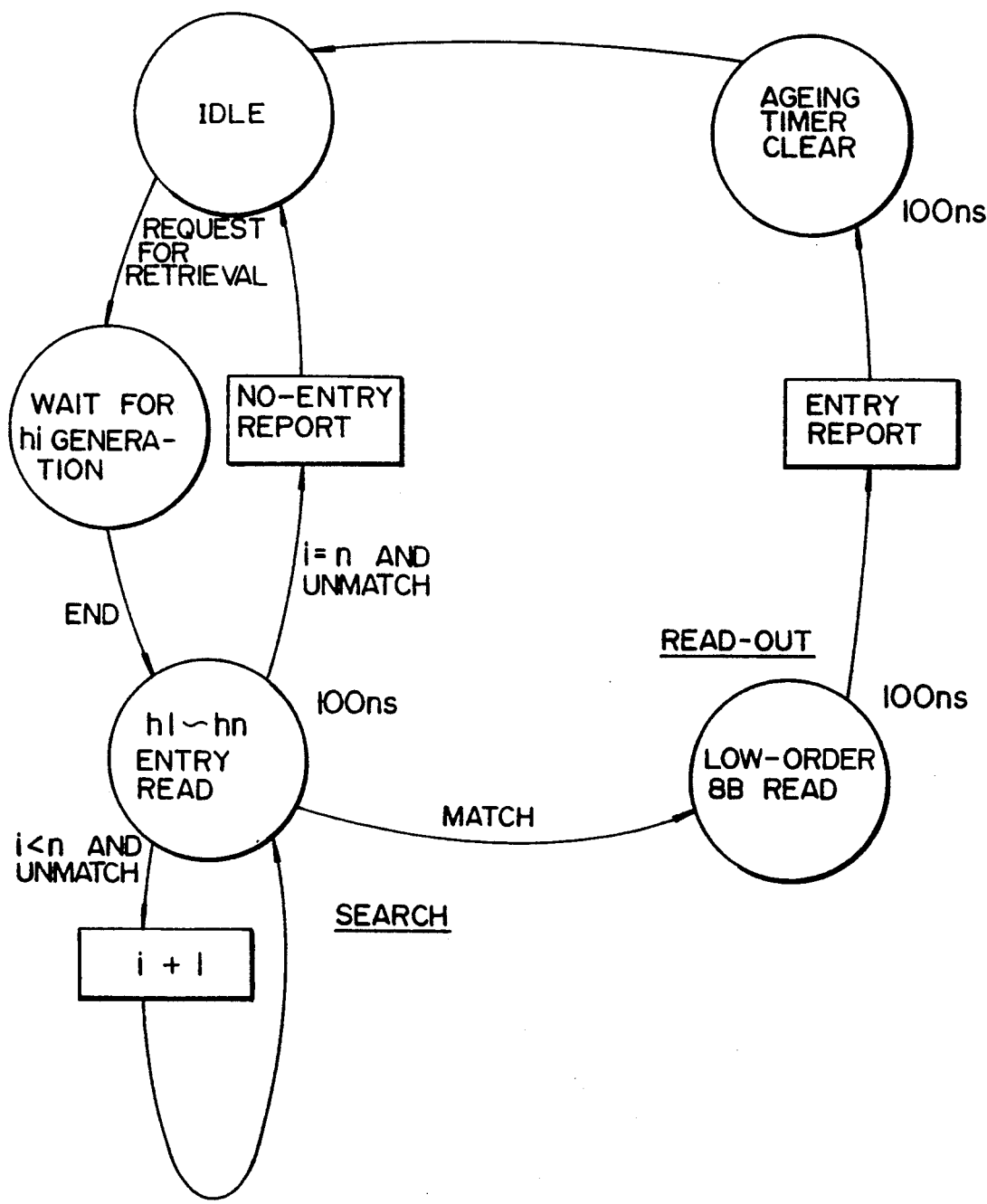
FIG. 12 is a state change diagram showing the operation of a retrieval processing.

FIG. 12 shows the state change diagram for the retrieval processing of the retrieval circuit 11138.

When there is a request for a retrieval from the state management circuit 11136 in the idle state, the source MAC address (SA) is read from the corresponding interface circuit (11131, 11132) and the generation of h1 by the hash circuit 11137 is awaited. When h1 has been generated, the entry of h2 and above (high-order eight bytes) is read sequentially starting with h1 from the entry table 1114. Since the high-order eight bytes of the entry include a MAC address, a decision is made whether this MAC address coincides with the MAC address which will become a key. When these MAC addresses coincide, the hash generation and the memory reading are stopped and the remaining low-order eight bytes of the entry are read. The entry is noted by to the corresponding unit and the aging timer value within the high-order four bytes is reset.

If no entry has been found after carrying out hashing by a maximum n times, no-entry is advised. In this case, the segment processing becomes broadcasting due to an unknown destination.

Description will now be made of the registration circuit.

The registration processing is carried out by the registration circuit 11139. As described previously, there are requests from the following directions in the registration processing:

① registration from the segmenting control section (learning of the upward direction)

② registration from the receiving path (learning from the cells received by the negative port of the downward direction)

③ registration from the common learning path (learning from all the highways of the downward direction).

Figure 13:
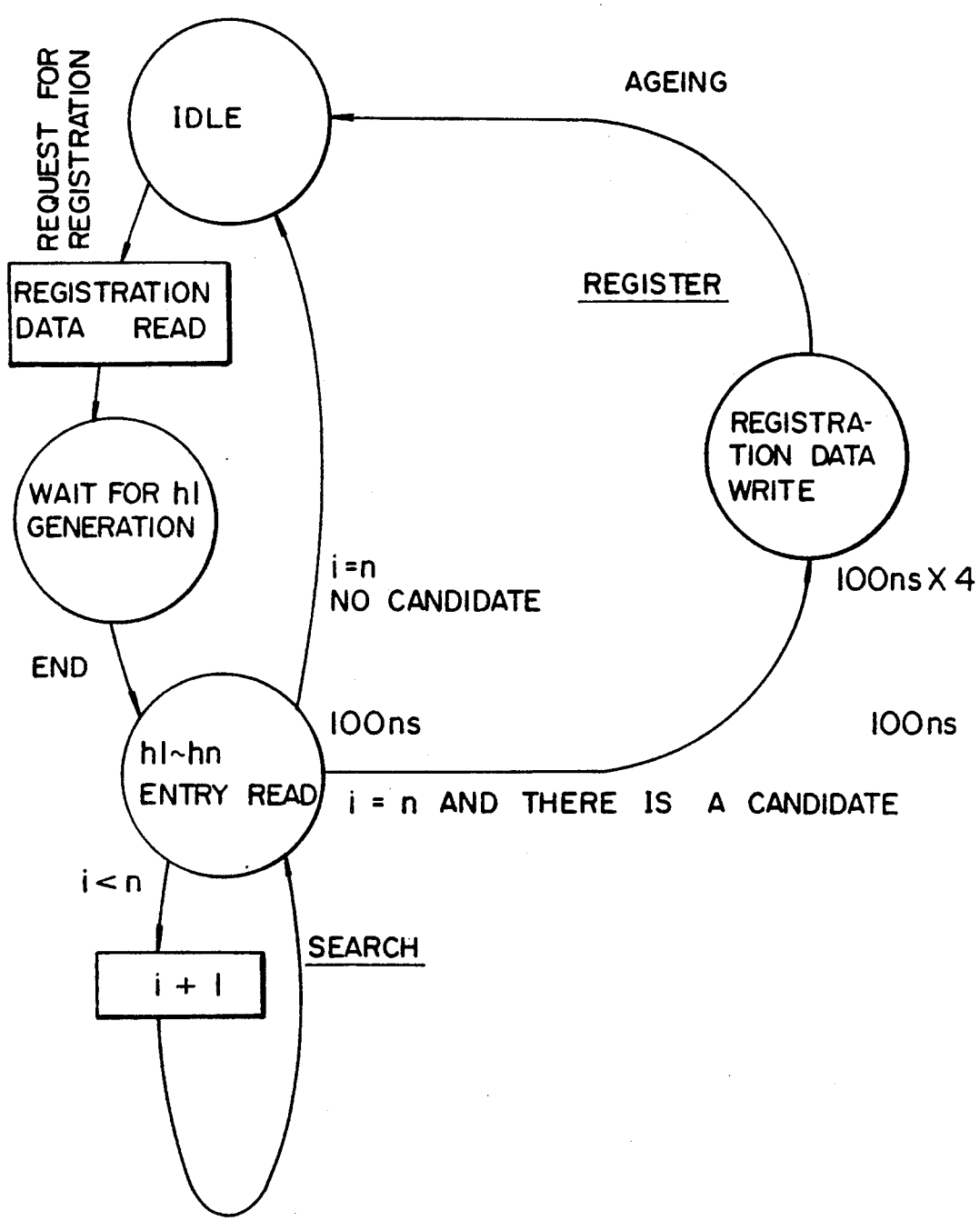
FIG. 13 is a state change diagram showing the operation of a registration processing.

FIG. 13 shows the state change diagram of the registration processing in the registration circuit 1139.

When there is a request for a registration from the state management circuit 11136 in the idle state, the destination MAC address (DA) is read from the corresponding interface circuit, and generation of h1 by the hash circuit 11137 is awaited. When h1 has been generated, the entry of h2 and above (high-order eight bytes) is sequentially read from h1. The high-order eight bytes include information to be used for determining candidates, including, the use/unuse dynamic/static and an ageing timer value. Candidates are determined in accordance with the above-described algorithm. When hashing has been carried out maximum of n times, the memory read is stopped and registration data of 16 bytes is written in the candidate entry position in after dividing the data into four. Then, the processing is terminated.

The timer value update processing for the ageing timer used for the deletion of the registration entry will be explained next.

In the present embodiment, in order to provide flexibility of the ageing timer value, the bridge processor 1115 is made to operate the timer and set a timer value unit time ΔT (resolution). The update processing of the ageing timer value is carried out intermittently so as not to interrupt the other processings.

Figure 14:
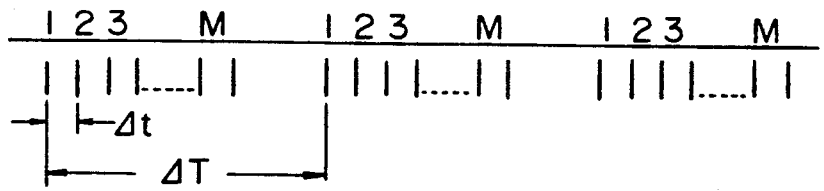
FIG. 14 is a timing diagram showing the timing of updating an aging timer.

FIG. 14 shows the timing for updating the ageing timer value.

The timer circuit updates the timer values of all the M entries (for example, 128 K entries) within the ΔT (resolution) time. For example, when the resolution of the timer value is a minimum of one second, in order to update all the entries, the interval Δt for updating between the entries is as follows:

Δt = one second ÷ 128 K = 7.8 μs.

In other words, if the entries are sequentially updated at every time interval of 7.6 μs or less, it is possible to update all the entries within the resolution time of the timer value. When update of all the entries has been completed within the time, updating is awaited until the next ΔT time-out.

Figure 15:
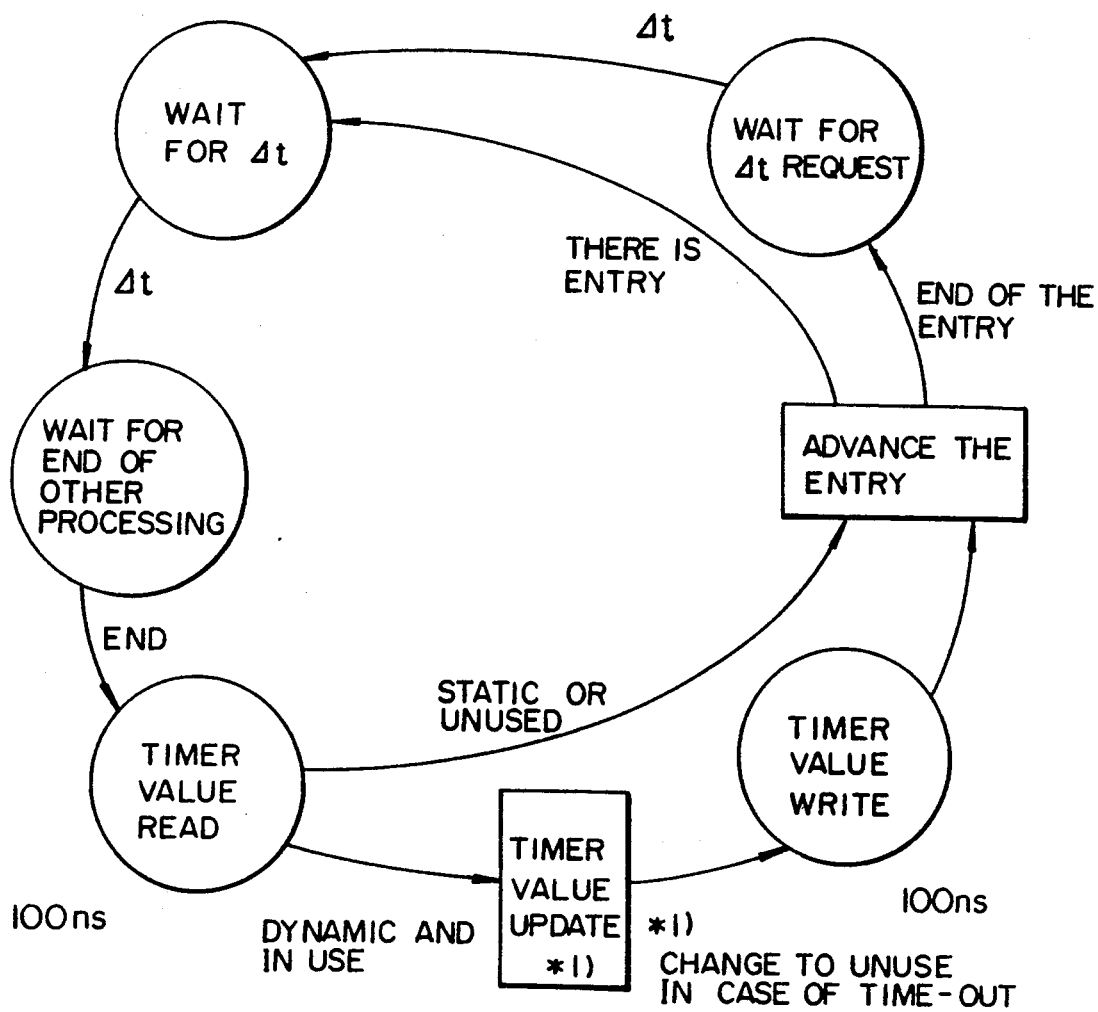
FIG. 15 is a state change diagram showing the operation of updating processing of the aging timer.

FIG. 15 shows the state change diagram for updating the ageing timer value.

As shown in FIG. 15, termination of other processing currently being carried out is sequentially awaited at every Δt, and updating is carried out as follows.

The high-order eight bytes of the entry are read. In the case of the "use" and "dynamic" state, the timer value in the corresponding entry is incremented in the use/unused display and the dynamic/static display and updated (high-order four-byte write).

When the timer value is time-out, the use/unuse display in the corresponding entry is rewritten to the unuse (high-order four-byte write) and the entry is deleted.

In the present embodiment, the bridge processor can make direct access to the entry table to carry out the following processings.

① Memory write/read test

The bridge processor 1115 issues a real address and directly writes and reads the entry table to carry out memory checking of the entry table.

② Valid entry search

The bridge processor 1115 issues a real address and directly reads the entry of the entry table to judge validity. In other words, the bridge processor 1115 judges whether the entry is in use. The bridge processor 1115 repeats this by sequentially advancing the memory address and searching for a valid entry.

When it is desired to make a copy of the information of the learned terminal position on the external storage or to make a copy of the information on the other bridge unit, the bridge processor reads a searched valid entry and makes a copy of it.

③ Entry updating

The bridge processor registers the entry by using the MAC address as a key. This is the same as the above-described registration processing.

According to the first embodiment, there are the following effects.

① It is possible to carry out filtering of the frame and to learn routing information in the bridge unit which connects the FDDI for transmitting in frame unit and the high speed trunk LAN for transmitting in the fixed-length cell unit.

② It is possible to carry out high speed filtering and learning by using the hash algorithm in the hardware for retrieval and registration in the entry table.

③ Since deletion of the entry in the entry table is intermittently and sequentially carried out by the ageing timer corresponding to each entry, it is possible to prevent the table from becoming full by learning without lowering the hit rate.

Further, since the ageing timer value is intermittently updated by advancing the entry position, the ageing timer processing does not affect the retrieval/registration processing performance.

Description will be made of the bridge unit relating to the second embodiment of the present invention.

Figure 16:
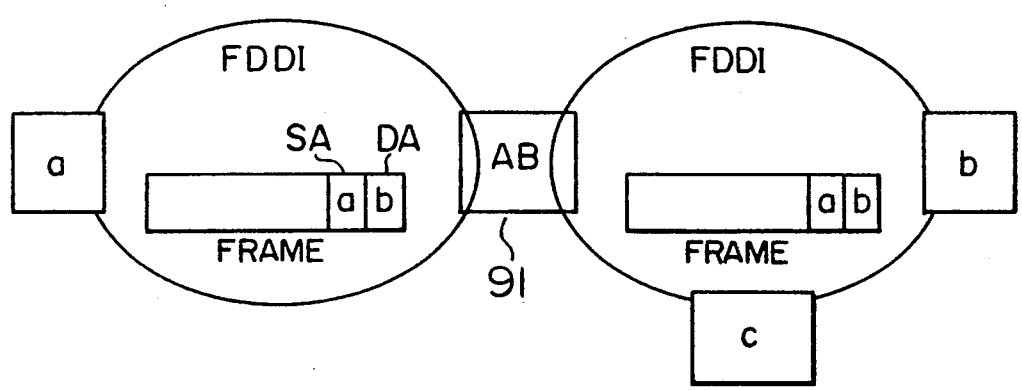
FIG. 16 is a system configuration diagram showing the configuration of a network system relating to a second embodiment of the present invention.

FIG. 16 shows the configuration of the network system using the bridge unit relating to the present embodiment.

As shown in FIG. 16, a bridge unit 91 relating to the present embodiment connects a plurality of FDDIs. To simplify the explanation, two FDDIs are connected in FIG. 16.

For the routing in the bridge unit 91 the position where the MAC address is located is shown as a port number for connecting FDDIs.

For example, the MAC address positions are shown as port A and port B. Since two FDDIs are connected in the present embodiment, there are two ports.

It is possible to carry out address filtering by retrieving a port number from the entry table 9114 by using the destination address as a key and making a decision of whether the transmitting port number is to be decided or discarded. The learning is carried out by registering, as a pair, the source address and the incoming port number to the entry table 9114.

Figure 17:
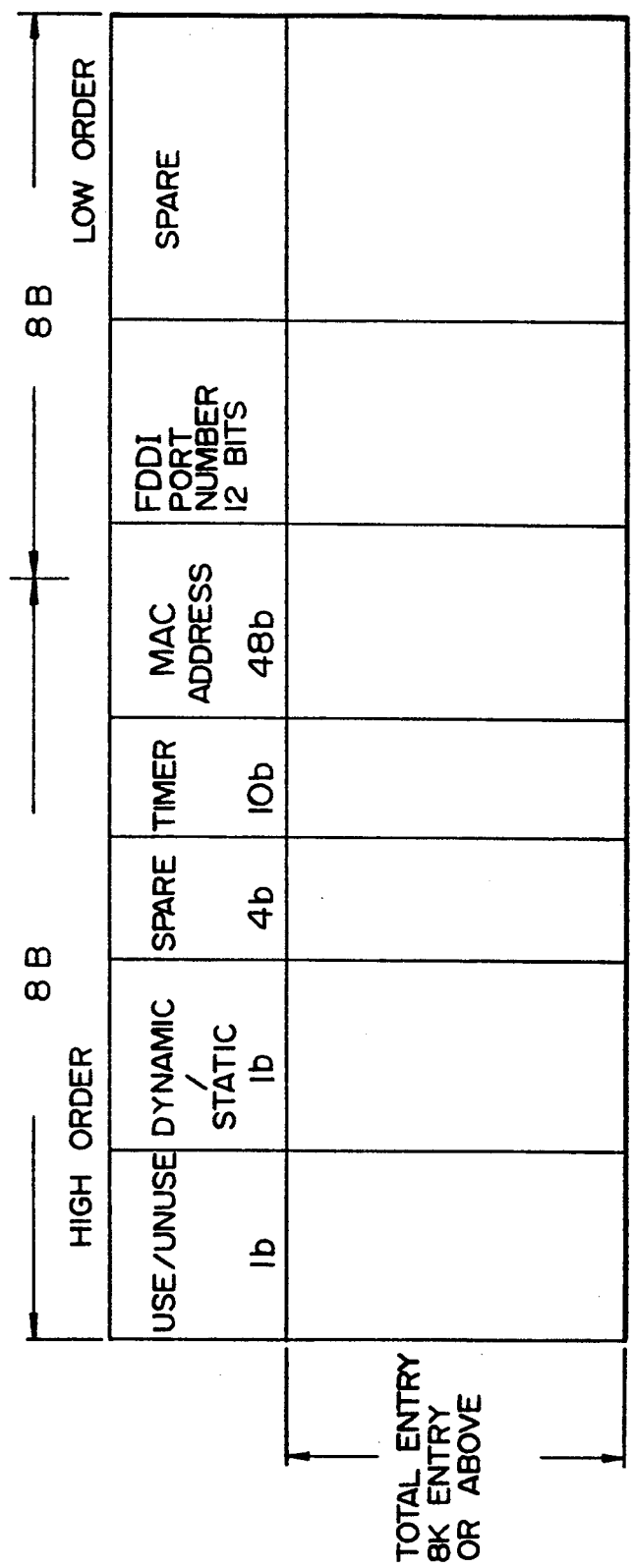
FIG. 17 is an explanatory diagram showing the configuration of an entry table.

FIG. 17 shows the configuration of the entry table 9114.

The direction of the source MAC address is shown as an FDDI port number, and the others are the same as those in the above-described first embodiment.

Figure 18:
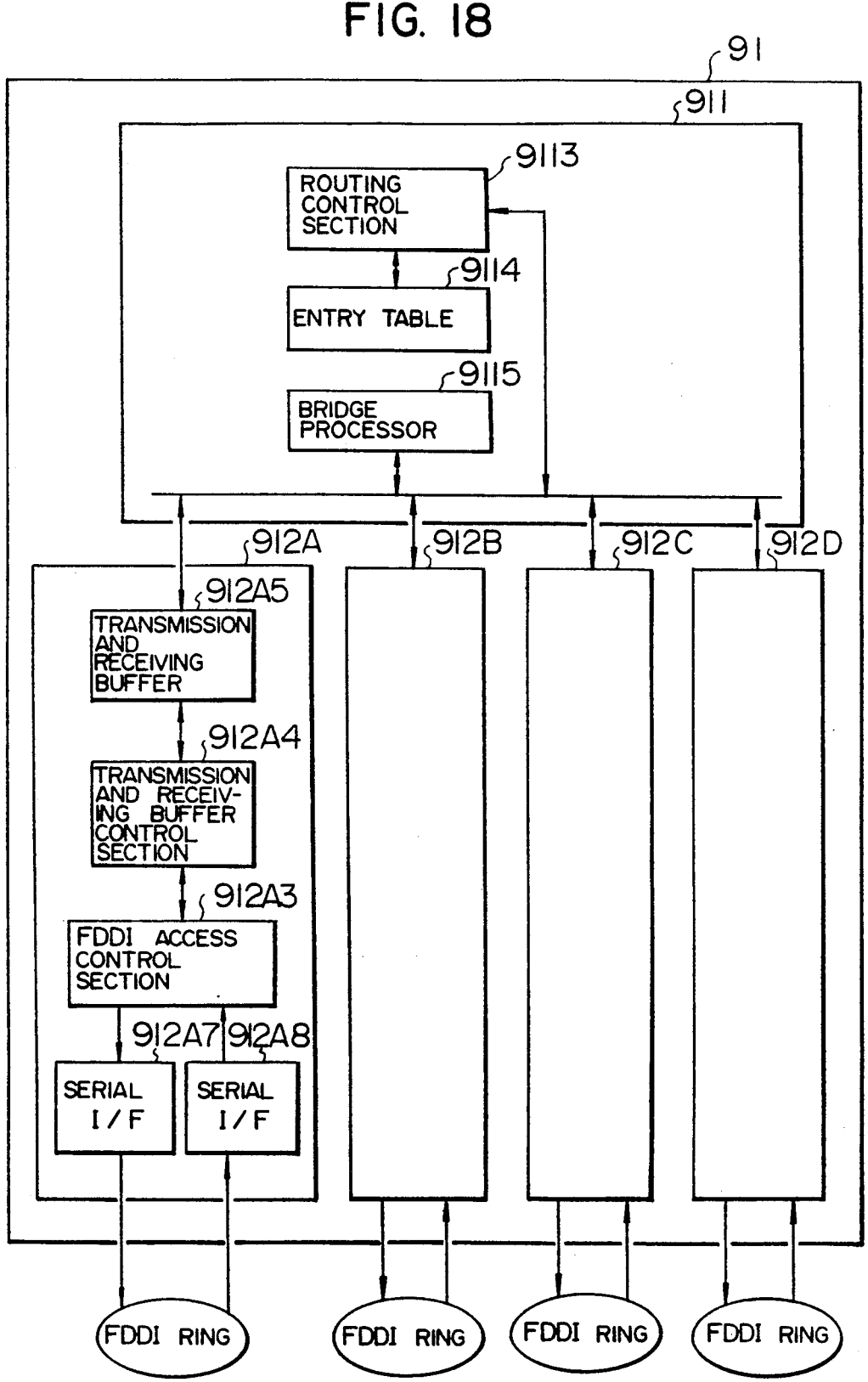
FIG. 18 is a block diagram showing the configuration of a bridge unit.

FIG. 18 shows the configuration of the bridge unit 91.

In FIG. 18, 91 designates a bridge unit for connecting the FDDIs and 911 designates a relay control section. 912A to 912D designate FDDI control sections (ports A to D) corresponding to the FDDIs A to D, respectively. 9113 designates a routing control section for carrying out learning of a station position and filtering of a relayed frame. 9114 designates an entry table.

The filter and learn processing is carried out as follows.

For example, when a frame has been received from the FDDI A, the bridge processor 9115 retrieves DA and SA of the received frame stored in the transmission/receiving buffer 912A5 and transmits these to the routing control section 9113.

For the filtering, the routing control section 9113 retrieves the entry table 9114 from the DA under the control of the routing control section 9113 to obtain a port number where the destination terminal exists.

Then, a decision of relay or discard is made as follows based on the result of the above operation.

①  The frame is discarded if the destination port number is equal to the incoming port number.

②  The frame is relayed to the corresponding port if the destination port number is not equal to the incoming port number. In other words, the received frame is copied in the transmission and receiving buffer of the corresponding port and then is transmitted.

③  The frame is relayed to all the ports if no destination port number is found.

The learning is carried out by registering, as a pair, the SA and the incoming port number in the entry table 1114 under the control of the routing control section 9113.

The operation of the routing control section 9113 is the same as that of the above-described first embodiment, and therefore, description of this operation will be omitted.

According to the above second embodiment, there are the following advantages.

① It is possible to carry out high speed filtering and learning by using the hash algorithm in the hardware for retrieval and registration in the entry table.

② Since deletion of the entry in the entry table is intermittently and sequentially carried out by the ageing timer corresponding to each entry, it is possible to prevent the table from becoming full by learning without lowering the hit rate.

Further, since the ageing timer value is intermittently updated by progressing the entry position, the ageing timer processing does not affect the retrieval/registration processing performance.

As described above, according to the present invention, it is possible to provide a bridge unit which can prevent the table from becoming full by learning without lowering the hit rate and which can flexibly correspond to movement of terminal position. It is also possible to provide an address filter unit which can improve the processing efficiency of the address filter processing.

As described above, according to the address filter unit relating to the present invention, a timer is provided corresponding to each address information. A timer updating unit sequentially and intermittently progresses each timer value. When the timer value becomes equal to or greater than a predetermined value, registration of the address information corresponding to the timer is deleted from the entry table. As such it is possible to prevent the table from becoming full by learning without lowering the hit rate.

Further, according to the address filter unit relating to the present invention, a timer is provided corresponding to each address information registration. When a timer updating unit is started at every constant period $\Delta T$, the timer updating unit sequentially and intermittently advances the value of each timer corresponding to the registered address information until the end. When the timer value reaches a predetermined value or greater, the registration of the address information corresponding to this timer is deleted from the entry table. As such it is possible to prevent the table from becoming full by learning without lowering the hit rate.

Further, according to the address filter unit relating to the present invention, in the first step a function ($f_i(a)$, $i=1$ to $n$) of the source address extracted from the incoming information frame at the time of registering in the entry table or the destination address extracted from the incoming information frame at the time of retrieval from the entry table is sequentially generated as an address of the entry table. In the second step, a decision is made at the time of registration whether the address information is to be registered in the address generated in the first step of the entry table. In the third step, a decision is made at the time of retrieval of whether the address information registered in the address generated in the first step of the entry table is the desired information. By the above processings, it is possible to improve the efficiency of using the entry table. Further, the efficiency of the address filter processing can be improved by pipe-line operating the first step with the second step or the third step.

Further, according to the address filter unit relating to the present invention, the priority order decision unit decides the priority order if at least two processings compete with each other among the registration of the incoming address information from the branch LAN in the entry table, the registration of the incoming address information from N transmission paths of the trunk network in the entry table and the retrieval of the address information from the entry table. In the mean time, the execution unit executes the processing based on the result of the above processing. By this arrangement, the address filter processing can be carried out smoothly, resulting in improved processing. If there is provided a storage unit for temporarily storing the incoming address information from the trunk network, the execution unit registers in the entry table the address information stored in the storage unit, while the other processings are not being carried out. By this processing, it is possible to secure the throughput performance of the actual address filter processing.

Further, according to the address filter unit relating to the present invention, the priority order decision unit decides the priority order of executing the registration of the incoming address information from the branch LAN in the entry table, the registration of the incoming address information from N transmission paths of the trunk network in the entry table and the retrieval of the address information from the entry table, so that the processing is carried out smoothly with improved efficiency. The address generation unit sequentially generates as an address of the entry table a function (fi(a), i=1 to n) of the source address extracted from the incoming information frame at the time of registering in the entry table or the destination address extracted from the incoming information frame at the time of retrieval from the entry table. The registration address candidate decision unit decides, at the time of registration, a registration address from the addresses sequentially generated by the address generation unit from the entry table, and the retrieval unit, at the time of retrieval, retrieves the desired address information from the address generated by the address generation unit in the entry table, so that the efficiency of using the entry table is improved. Further, the address generation processing for generating the i-th address by the address generation unit, the retrieval processing for retrieving the (i−1)th address by the retrieval unit or the decision processing for discriminating the (i−1)th address by the registration address candidate decision unit are carried out in parallel to improve the efficiency of the processings.

Further, according to the relay unit relating to the present invention, the address filter unit carries out an address filtering processing. Based on the result of the address filtering processing, the data format conversion unit converts the information frame to be relayed to the other network into the data format of the network to which the frame is to be relayed.

Further, according to the bridge unit relating to the present invention, the address filter unit carries out an address filter processing. Then, in the relay unit, based on the result of the address filter processing by the address filter unit, the reassemble unit converts the information frame to be relayed from the trunk network to the branch LAN into the data format of the branch LAN. Based on the result of the address filter processing, the segmenting unit converts the information frame to be relayed from the branch LAN to the trunk network into the data format of the trunk network. In the mean time, the LAN control section makes it possible to transmit the information frame to and from the branch LAN.

In the present bridge unit, when the address filter unit is provided which registers address information in the entry table by extracting the address information from the information frame on the branch LAN, the information frame transmitted to the same bridge unit on the trunk network and the information frame sent to the other bridge unit other than the information frame relayed by at least the same bridge unit on the trunk network to the trunk network, it is desirable that the information frames received from the trunk network are all relayed to the branch LAN without having the address filter processing.

Description will now be made of an example of the case where the configurations of the routing control section (113, 9113) and the entry table (1114, 91114) in the first and second embodiments are made compact and speedy.

A third embodiment of the present invention will be explained below.

First, a dynamic random access memory (D-RAM) used as a memory element in the storage circuit (corresponding to the routing control section and the entry table) relating to the present embodiment will be explained.

Figure 19:
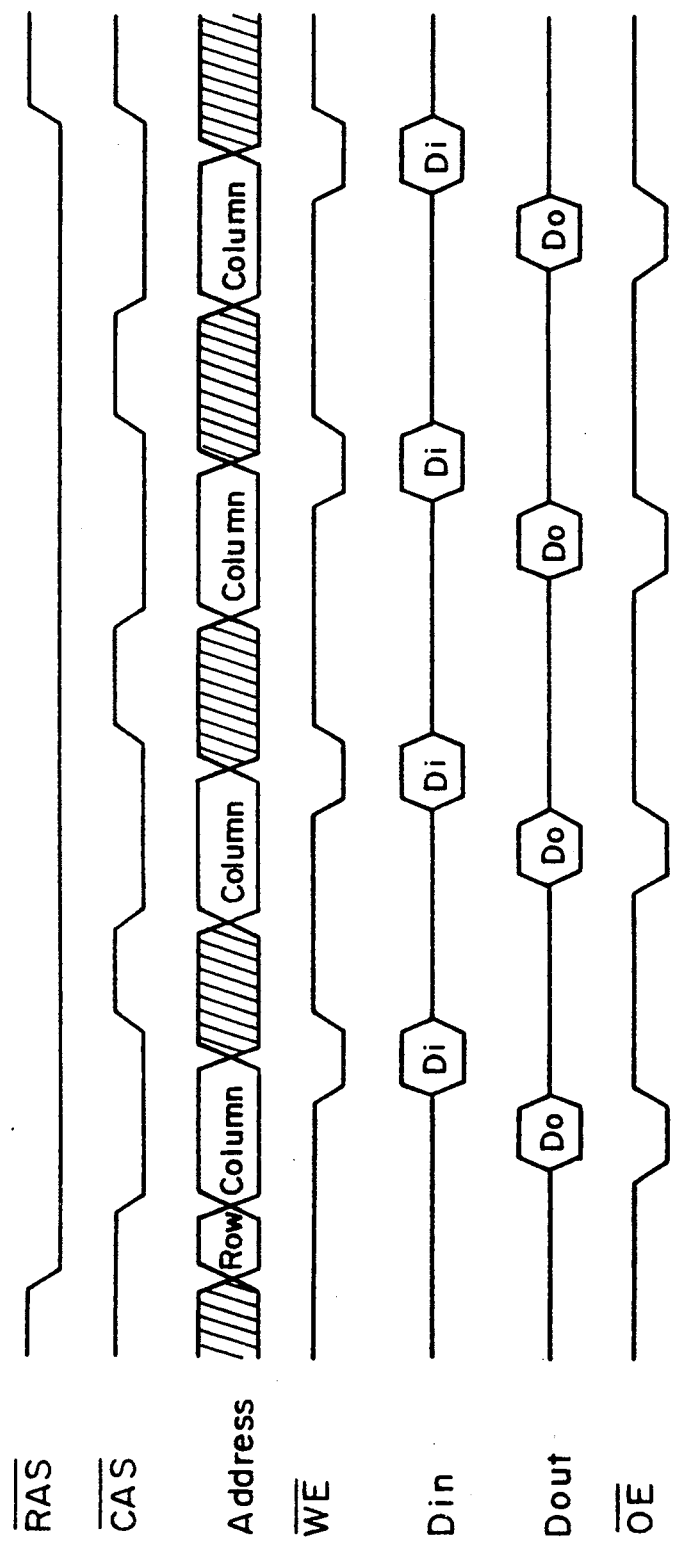
FIG. 19 is a time chart showing the operation of a D-RAM used in a storage circuit.

FIG. 19 shows a high speed page mode read modify write cycle of the D-RAM.

As shown in FIG. 19, the read modify write is a mode in which WE is negative, CAS is asserted and data is read from Dout. The WE is asserted in the same cycle so that data is written in the same address from Din. In the present embodiment, the D-RAM is used in the high speed page mode read modify write mode which is a combination of the read modify write mode and a page mode which is a high speed mode.

i Of course, in this case, updating of the column address is carried out in synchronism with the negate of the CAS.

The high speed page mode is the mode in which data of the same row is continuously read by changing only the column address. The high speed page mode is being widely employed together with the read modify write mode in the commercially available D-RAM IC or the like.

Next, the outline of the operation of the storage circuit relating to the present embodiment will be explained.

The storage circuit relating to the present embodiment uses the hash method in the retrieval/ registration processing.

The hash method is the method for calculating a position where a data value is to be stored by carrying out a predetermined conversion to the data value.

In other words, according to the hash method, elements for storing data are decided in accordance with the data value or a value K (which is called a key) included in the data. Therefore, retrieval of the data can be completed by merely checking these elements.

According to the hash method, there is a case that h(k)=h(k') where k is different from k'. However, in this case, re-hash hi(k) (i=2 to n) is generated to avoid a collision.

In the retrieval/registration processing, a value generated from the hash function, that is h(k), is used as an address for the memory element. In other words, a registration is made in the storage position indicated by h(k), or data is compared with the data stored in the storage position indicated by h(k).

Figure 20:
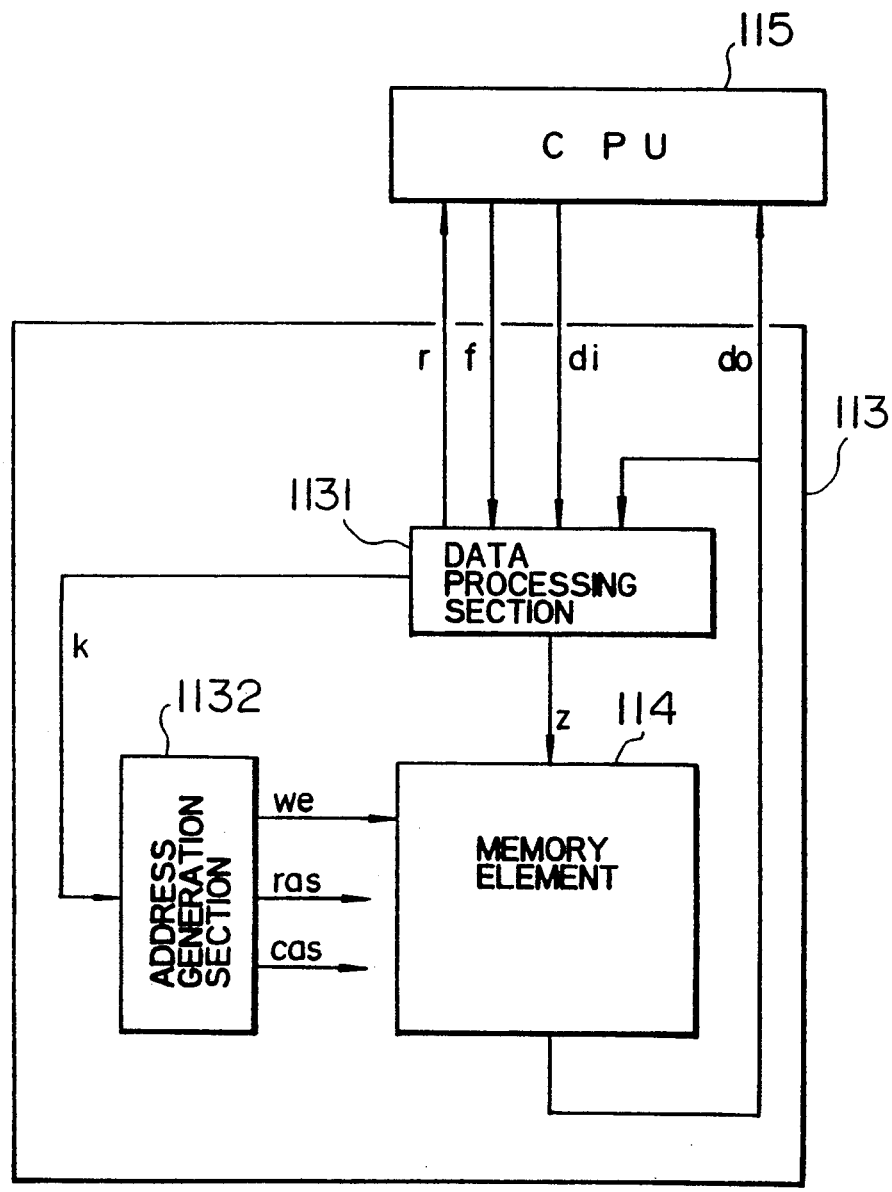
FIG. 20 is a block diagram showing the configuration of a data base using the storage circuit.

FIG. 20 shows the configuration of the data base in which the storage circuit relating to the present embodiment is used.

In FIG. 20, 113 designates a storage circuit corresponding to the routing control section (1113, etc.), 1131 a processing section, and 1132 an address generation section. 114 designates a storage element corresponding to the entry table (1114, etc.) and 115 designates a processing unit corresponding to the bridge processor (1115, etc.). In the present embodiment, the storage circuit 113 is integrated into a one-chip integrated circuit.

A signal f designates a function for designating a processing of the storage circuit 113 by the processing unit 115, r designates a result of the processing by the storage circuit 113, di designates input data from the processing unit 115, z designates data to be written to a memory element 114, do designates data to be read from the memory element 114, and k designates a value which becomes a key of the hash function h(k). Details of the function will be described later.

Figure 21:
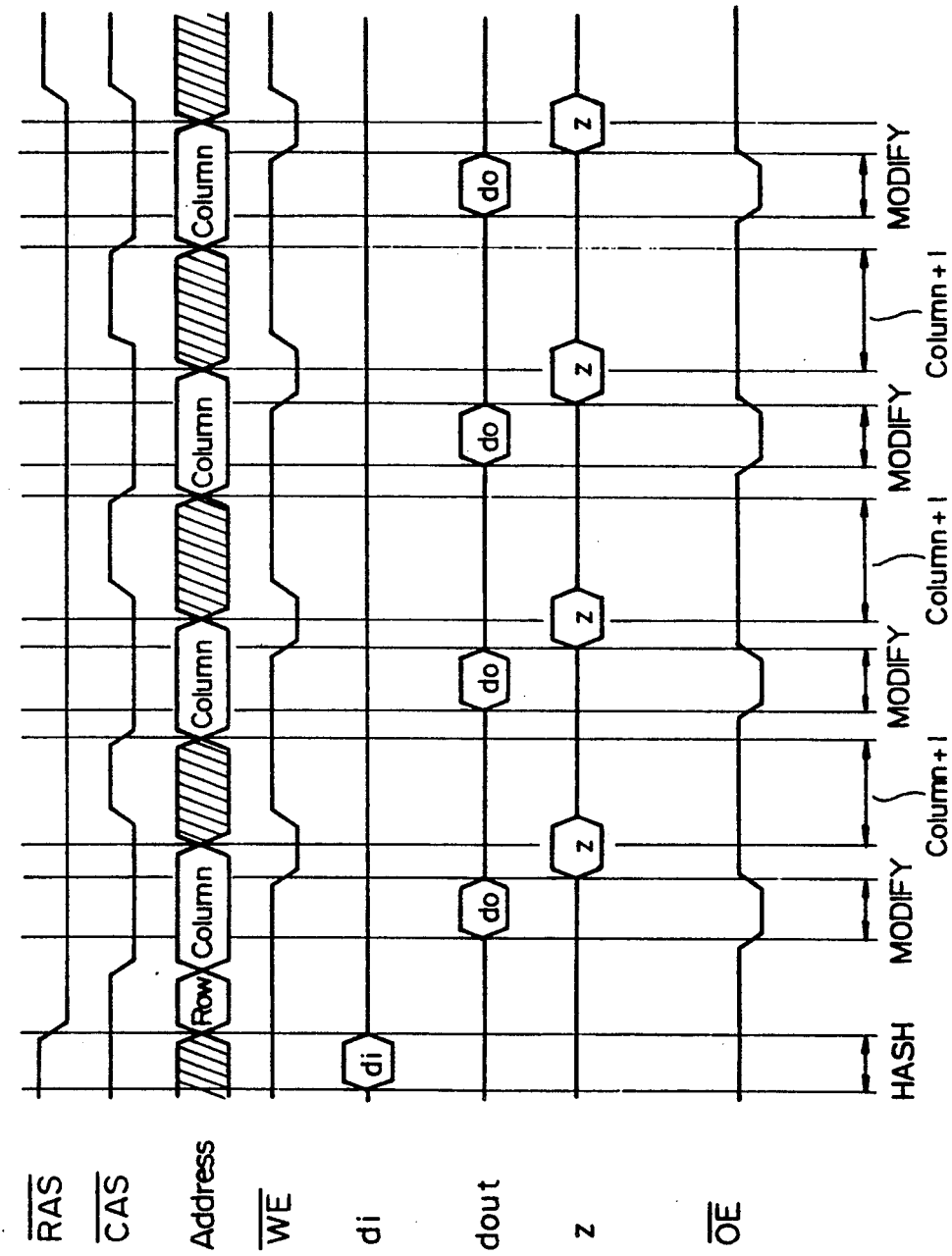
FIG. 21 is a time chart showing the operation of the storage circuit.

The operation of the storage circuit 113 will be explained based on the timing chart shown in FIG. 21.

First, the key k is extracted from the input data di in the data processing section 1131. The row address and the column address are generated from the hash function h(k) in the address generation section 1132, and they are asserted in the memory element 114.

Based on the read data do and the input data di read from the address, the data processing section 1131 processes the data to generate the write data z and writes this data z in the memory element 114. The data processing is decided from the relationship between the input data di and the read data do.

The column address is incremented and the above operation is repeated until the termination condition to be decided from the relationship between the input data di and the read data do is met.

In other words, in the present embodiment, $hi+1 (10) = hi (10) + 1$ is set so that it is possible to utilize the high speed page mode read modify write cycle of the D-RAM. A series of operation by the above-described re-hash is realized in one cycle.

The above operation will be explained below in accordance with the state change shown in FIG. 22.

The address generation section 1137 generates the row address and the column address from the first hash function h1(k) of the key k. The processing section 1131 reads data from the corresponding address.

For the purpose of explanation, it is assumed that the key k is a value included in the input data di.

The data processing section 1131 generates the write data z from the input data di and the read data do in accordance with the condition of the function f and the read data do, and writes the data z in the same address. Until the termination condition corresponding to the respective functions is met, the column address continues to be generated from the re-hash function hi(k) (i=2 to n) and the above processing is repeated. As described above, $hi+1 (10) = hi (10) + 1$ is assumed in the present embodiment.

When the processing has been terminated, the result r of the processing is returned to the CPU 115.

Assuming the DRAM has 4M bits and the data length is 64 bits, the maximum number of the row addresses and the column addresses is calculated to be 4 M bits/64 bits = 64 K entries. Therefore, if re-hash is carried out by eight (n) times, the column address can be 0 to 7 and the row address can be from 0 to 8k−1.

Details of the above-described functions will be explained below.

The storage circuit relating to the present embodiment has the functions of ① retrieval processing, ② the registration processing and ③ ageing timer update processing.

The signal f (FIG. 20) designates one of the above functions and the storage circuit 113 carries out a processing based on the indicated function.

Details of each of the processings will be explained with reference to FIG. 23, FIGS. 24 and 25 and FIG. 26.

Figures 22, 23:
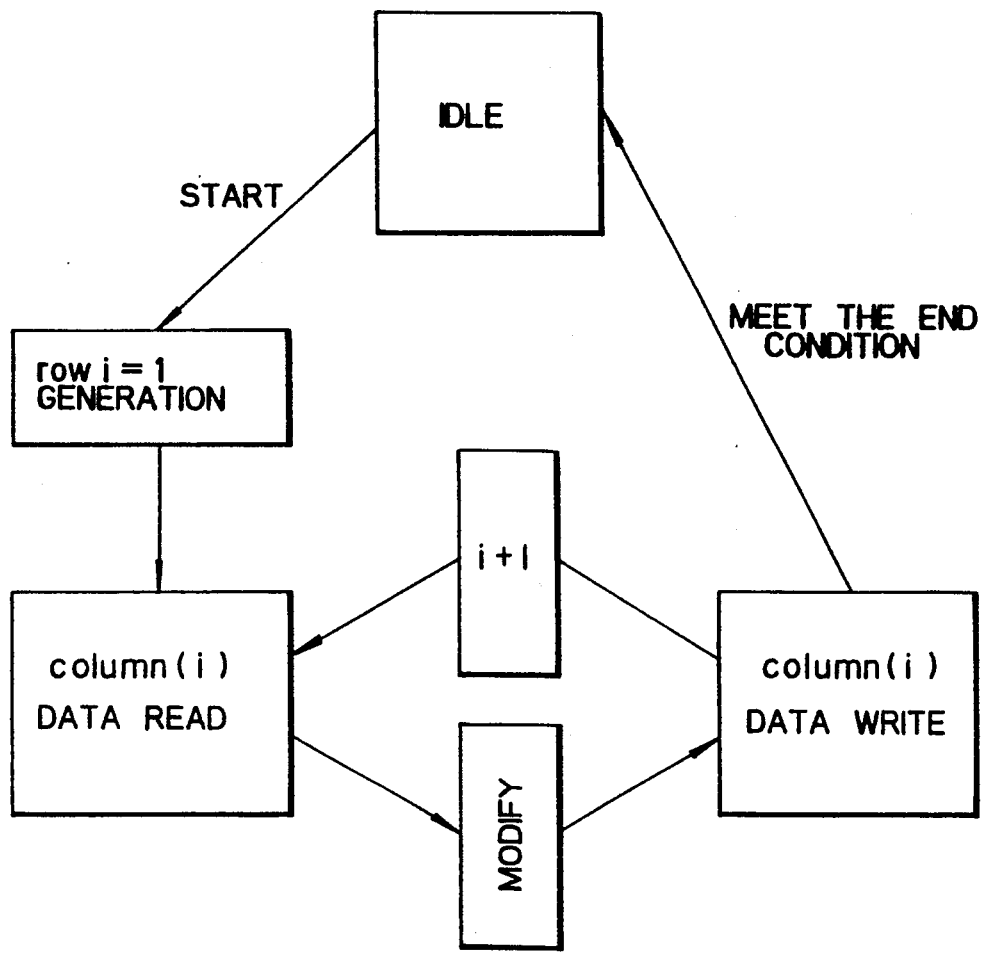
FIG. 22 is a state change diagram showing the operation of the storage circuit.
FIG. 23 is an explanatory diagram showing a field configuration of memory data.

FIG. 23 shows the configuration of the fields of each entry of the memory element 114. As shown in FIG. 23, the fields comprise a key k, an entry e and a timer t.

Figure 24:
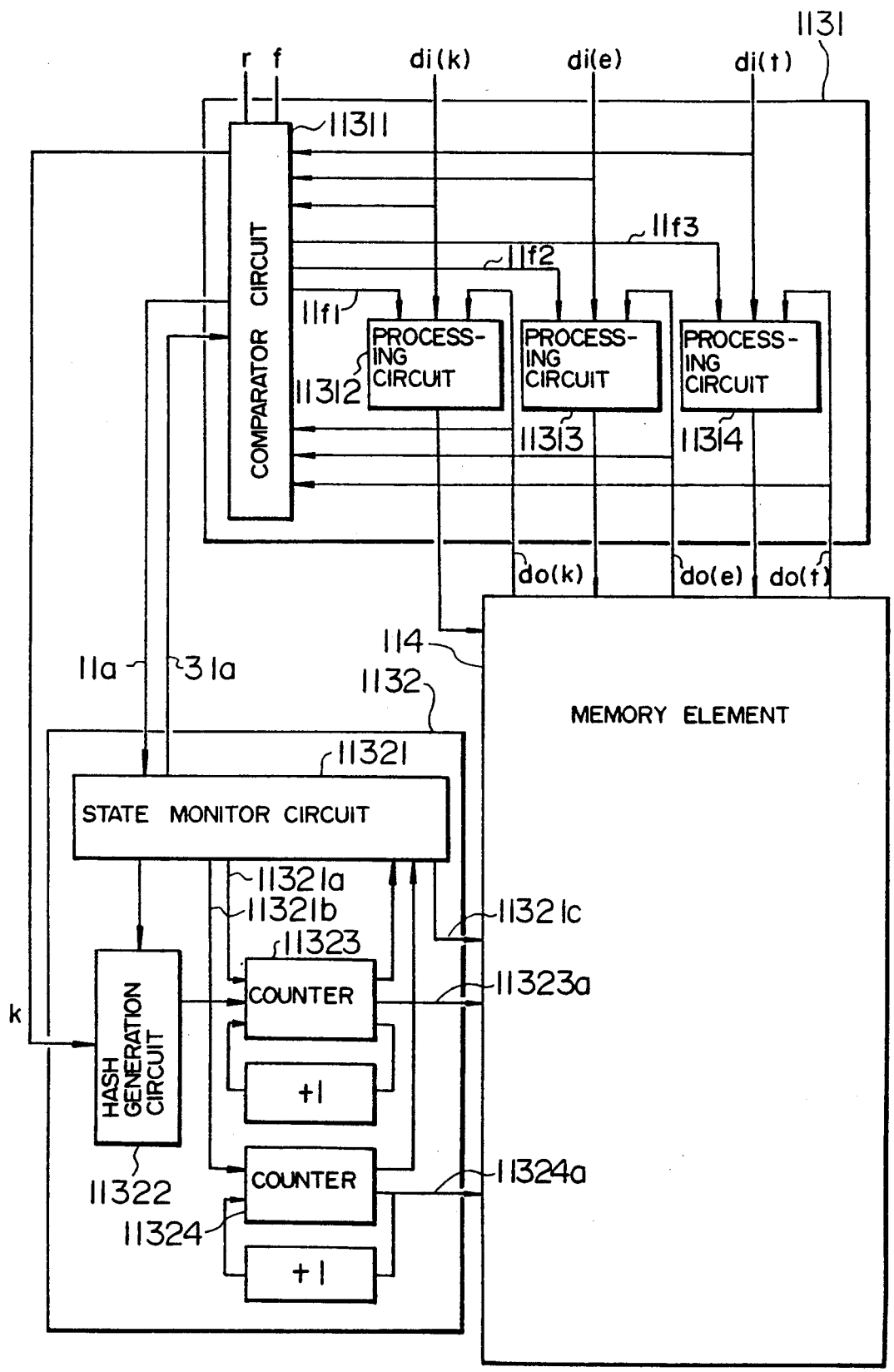
FIG. 24 is a block diagram showing the configuration of a storage circuit relating to a third embodiment of the present invention.

FIG. 24 shows the details of the storage circuit 113.

In FIG. 24, 1131 designates a processing section for controlling data processing. 11311 designates a comparator circuit for comparing each of the fields k, e and t of the input data di with each of the fields k, e and t of the read data do, and carries out a predetermined operation based on the result of the comparison. 11312, 11313 and 11314 designates data processing circuits for carrying out a predetermined data processing of k, e and t of the di and k, e and t of the do in accordance with indications 11f1, 11f2 and 11f3 of the comparator circuit generating a write data z (k, e, t).

1132 designates an address generation section for generating an address for the storage element 114 in accordance with an indication from the data processing section 1131.

11321 designates a state monitoring circuit for receiving a start indication from the data processing section 1131, which controls the state of the memory element access by monitoring the state in accordance with the state change to be described later, and which continues the operation until an end indication is received from the data processing section 1131. 11322 designates a hash generation circuit for generating a hash from the key k, and 11323 and 11324 designate counter circuits for updating the row and column addresses in accordance with an instruction from the state monitoring circuit respectively.

The processing of the storage circuit 113 is instructed by the CPU 115 which outputs data di to the storage circuit 113 and issues the function f.

Then, the CPU 115 waits until the following processing has been completed in the storage circuit 113.

First, the data processing section 1131 within the storage circuit 113 will be explained in detail.

FIGS. 25 and 26 show the contents of the processing by the data processing section 1131.

The comparator circuit 11311 decodes the function f received from the CPU 115, transmits the key k to the address generation circuit 1132 and carries out the following operation.

① For the retrieval processing, the comparator circuit 11311 repeats the processing of the read modify write until the key k of the input data di coincides with the key k of the read data do.

When the keys do not coincide in the above processing, it is indicated to the processing circuits 11312 to 11314 that no alteration is made to the read data do and the processing is repeated.

On the other hand, when the keys coincide in the above processing, the comparator circuit 11311 indicates to the processing circuit 11314 that the timer value t of the read data do is cleared and indicates to the processing circuits 11312 and 11313 that the data is not processed (the do is passed through).

Then, termination of the processing is indicated to the state monitoring circuit 11321 (FIG. 26a).

The processing is terminated even if the keys do not coincide after the hashing has been repeated to the maximum number.

After the processing has been terminated, the comparator circuit 11311 returns the processing result r (discovery/non-discovery) to the CPU 115. The CPU 115 receives the result r and reads the read data do (desired data) in the case of a discovery and terminates the retrieval processing in the storage circuit 113.

② For the retrieval processing, the comparator circuit 11311 repeats the processing of the discovery of a registerable position until the di(k) coincides with the do(k) or until a space is found where the di(k) can be registered. When the space cannot be found, it is indicated to the processing circuits 11312 to 11314 that the read data do is not processed and the processing is repeated.

On the other hand, when the space has been found, it is indicated to the processing circuits 11312 and 11313 that the input data di is outputted and it is reported to the processing circuit 11314 that the timer value t is cleared.

Then, termination of the processing is indicated to the state monitoring circuit 11321 (FIG. 26b). A condition for a registerable area is the case where the key data coincide (di(k)=do(k)) or the case where the key data is empty (do(k)="10").

The processing is also terminated when no registerable area is found after hashing has been repeated to the maximum (n times).

After the processing has been terminated, the comparator circuit 11311 returns the processing result r (registration/non-registration) to the CPU 115. Upon receiving the result r, the CPU 115 terminates the registration to the storage circuit 113.

③ An update processing of the ageing timer is carried out as follows.

The updating processing of the ageing timer refers to the processing of deleting the entry which has not been used within a predetermined time.

In the present processing, no hash function is used to generate an address, and the value of a key is made the row address, and the column address is simply incremented to repeat the processing.

For the data processing, it is indicated to the processing circuit 11314 that the timer value of the read data is incremented (z(t)=do(t)+1), and it is indicated to the processing circuits 11312 and 11313 that data is not processed (FIG. 26c).

When the timer has come to time-up, the key data of the corresponding position is made invalid (for example, 0 is written) and the data is deleted (FIG. 26d).

When the hashing has reached the maximum number (n times), the processing is terminated.

If the function of the ageing timer is not used, the processing unit 115 may not issue this function.

In the above processing ① to ③, the write data z(k), z(e) and z(t) generated in the processing circuits 11312 to 11314 (FIG. 26) are written in the main memory element 114 under the control of the address generation section 1132.

Next, the address generation section 1132 will be explained in detail.

The state monitoring circuit 11321 starts the operation based on the start indication from the comparator circuit 11311 and issues the timing signal 11321 to the memory element 114, thus continuing the operation until there is an end indication (FIG. 24).

The hash generation circuit 11322 generates the row address from the key k obtained from the comparator circuit 11311, and loads the initial row address in the counter circuit 11323.

The counter circuits 11323 and 11324 hold the row address 11323a and the column address 11324a respectively and increment in accordance with the timings 11321a and 11321b indicated by the state monitoring circuit 11321.

As described above, according to the present embodiment, it is possible to realize a data base using the re-hash method, and particularly there are the following effects.

① It is possible to carry out a retrieval or registration processing in the memory in one cycle.

② It is possible to delete registration data which is not required for a predetermined period.

③ It is possible to reduce the read modify timing and speed-up the processing when the data is handled in one chip.

On the above embodiment, the data processing section, the address generation section and the memory are realized in one chip. However, the chip may be divided as shown in FIG. 27(a) to (b) according to other conditions such as a memory capacity, etc. of the storage circuit.

Figure 27A:
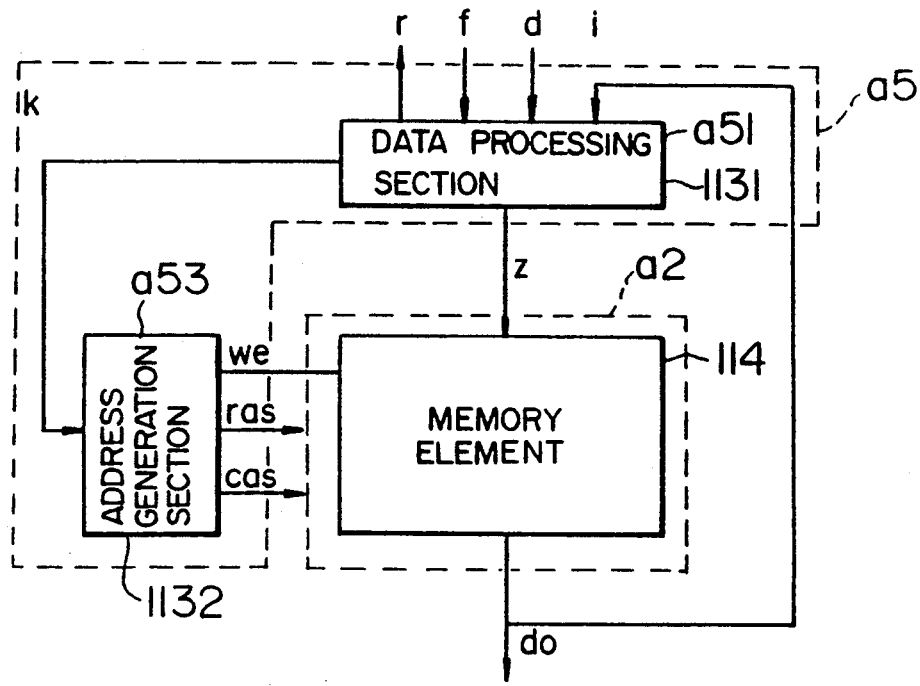
FIG. 27 (a–d) are a diagram showing chip division of the storage circuit.

More specifically, FIG. 27(a) shows a case where the data processing section 1131 and the address generation section 1132 are integrated and only the DRAM 114 is separated. By this arrangement, it is possible to realize a data base function by utilizing a general DRAM.

Figure 27B:
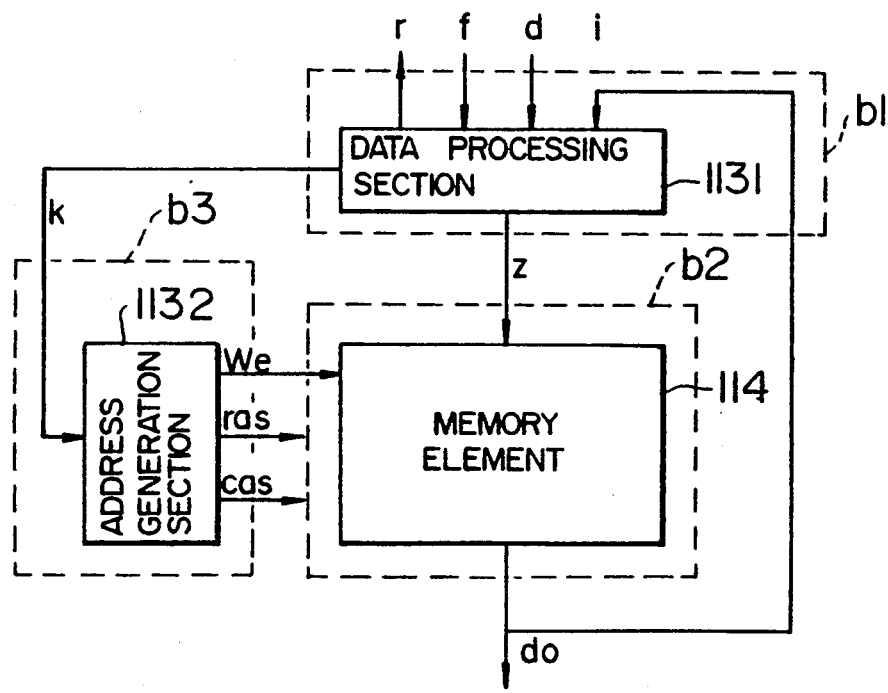

FIG. 27(b) shows a case where the data processing section 1131, the address generation section 1132 and the DRAM 114 are separated. By this arrangement, it is possible to have flexibility in the modify method and the hash method.

Figure 27C:
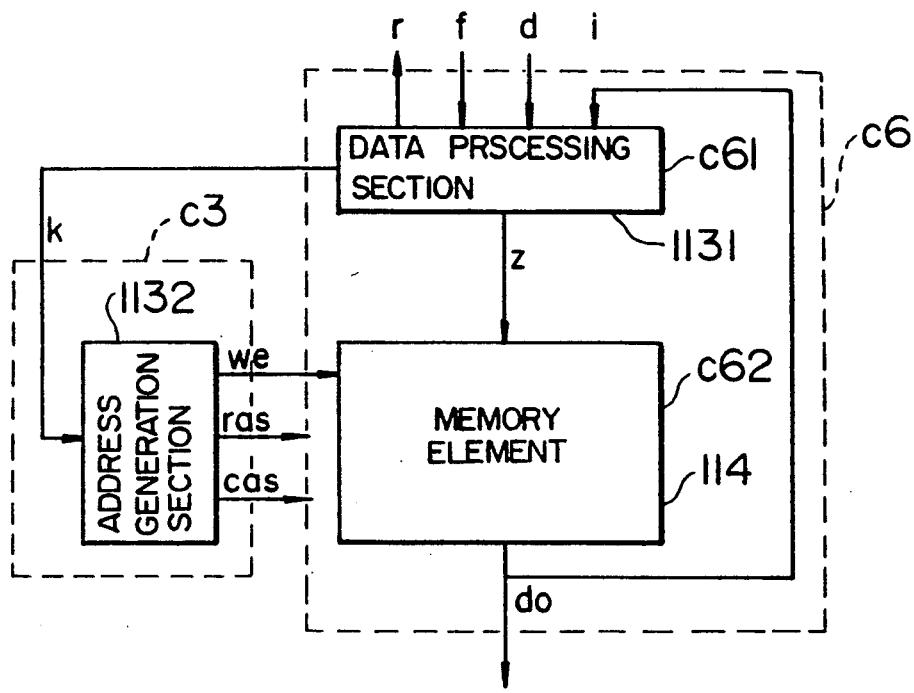
Figure 27D:
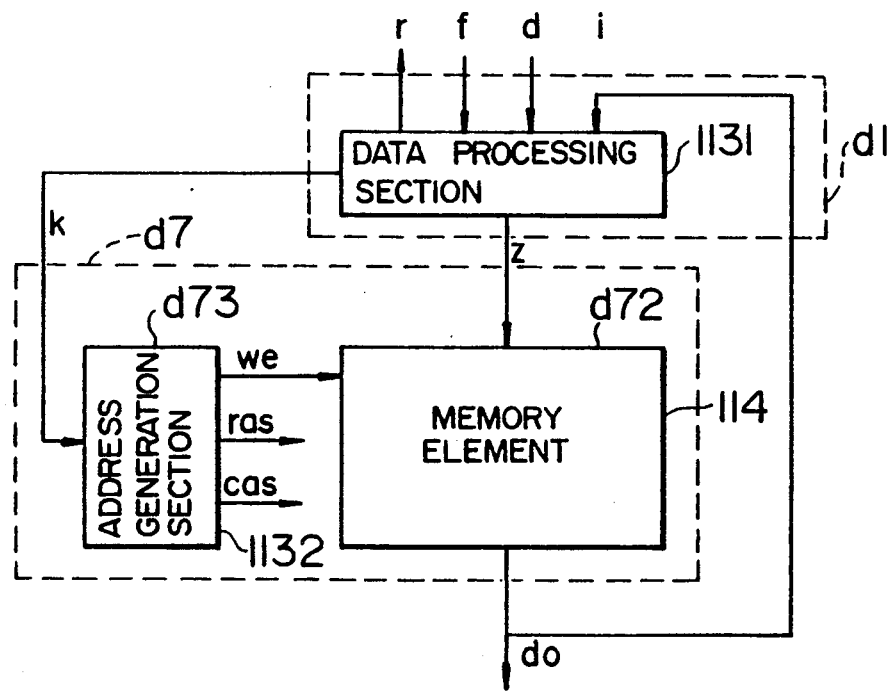

FIG. 27(c) shows a case where the data processing section 1131 and the DRAM 114 are integrated whereas the address generation section 1132 is separated. By this arrangement, it is possible to have flexibility in the hash method and to realize a memory for storing the function of continuous data processing.

FIG. 28(d) shows a case where the address generation section 1132 and the DRAM 114 are integrated, whereas the data processing section 1131 is separated. By this arrangement, it is possible to have flexibility in the modify method and to realize a memory for storing the continues address generation according to the hash method.

Description will now be made of the bridge unit using the storage circuit explained in the third embodiment as the address data base, as a fourth embodiment of the present invention.

The configuration of the network system which is mutually connected by the bridge unit relating to the fourth embodiment is the same as the one shown in FIG. 16.

As shown in FIG. 16, the bridge unit relating to the present embodiment connects a plurality of fiber distributed data interfaces (FDDIs).

The bridge unit comprises an address table for storing a position where a terminal exists. In the case of relaying data, the bridge unit refers to the address table and the destination address of the incoming packet to make the decision of relay or discard. In other words, the bridge unit carries out the address filtering processing.

More specifically, if the destination terminal of the packet is in the direction of another LAN or if the destination is not known. The packet is relayed, The packet is discarded if the destination terminal is in the incoming direction.

Further, the bridge unit refers to the incoming packet and registers the source address and the terminal position in the address table, thereby to carry out learning.

The address table is reviewed at every predetermined period for the purpose of:

① preventing the table from becoming full
② adjusting to movement of terminal position, and deleting the registration of the terminals to which no packet is transmitted.

FIG. 16 shows the case where the bridge unit connects two FDDIs to simplify the explanation.

In the bridge unit relating to the present embodiment, the routing is carried out by expressing the position where the medium access control (MAC) address (48 bits) exists by the number of the port of the bridge unit for connecting the FDDIs.

For example, the MAC address positions are expressed as port A and port B. In the present embodiment, two FDDIs are assumed to be connected. Therefore, there are two ports.

The structure of this address table is the same as the one shown in FIG. 17 and FIG. 23.

The address table has MAC addresses, FDDI port numbers showing directions of the MAC addresses and the ageing timer.

Figure 28:
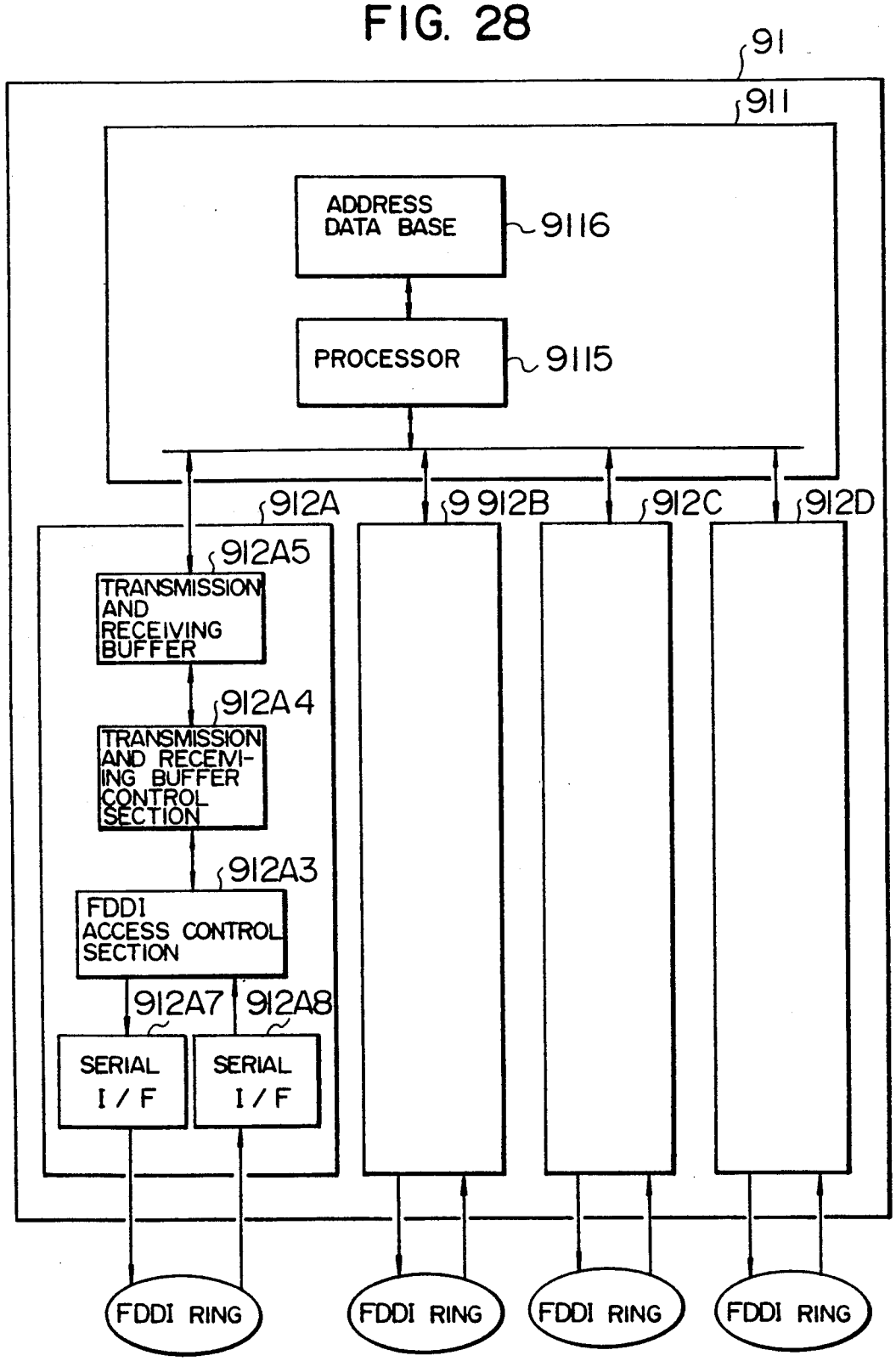
FIG. 28 is a block diagram showing the configuration of a bridge unit.

FIG. 28 shows the configuration of the bridge unit relating to the fourth embodiment of the present invention. This corresponds to the configuration of the bridge unit in FIG. 18.

In FIG. 28, 91 designates a bridge unit for connecting the FDDIs, and 911 designates a relay control section. 912A to 912D designate FDDI control sections (ports A to D) corresponding to the FDDIs A to D, respectively.

9116 designates an address data base for carrying out the learning of the station position and determining of relay/discard of the relayed frame (filtering). This a dress data base uses the storage circuit 113 relating to the third embodiment.

9115 designates a processor.

The operation of the processor 9115 will be explained below.

First, the filtering is carried out as follows.

When a frame has been received from the FDDI A, for example, the processor 9115 extracts a destination address (DA) of the received frame stored in the transmission/receiving buffer 912A5, transmits the DA to the address data base 9116 and issues the retrieval function explained in the third embodiment. The processor 9115 can discover the port number where the destination terminal exists from the data obtained from the address data base 9116 (do in the preceding embodiment).

In the address data base 9116, the MAC address corresponds to the key field in FIG. 23, the port number corresponds to the entry field and the ageing timer corresponds to the timer field in FIG. 23, respectively.

As a result of the above processing, relay or discard is decided as follows.

① The frame is discarded when the destination port number is equal to the incoming port number.
② The frame is relayed to the corresponding port when the destination port number is not equal to the incoming port number. In other words, the received frame is copied in the transmission and receiving buffer of the corresponding port and then is transmitted.
③ The frame is relayed to all the ports when the destination port number is not found.

The learning is carried out by transmitting the source address (SA) and the incoming port number to the address data base 9116 and by issuing the registration function explained in the third embodiment.

The value of the ageing timer corresponding to the memory of the row address is updated by transmitting the row address to the address data base 9116 and issuing the ageing timer function explained in the third embodiment. By intermittently incrementing the row address, it is possible to update the ageing timer value corresponding to all the memory addresses.

For example, when no ageing timer is required in the bridge unit or when deletion of a registration value is not necessary in the system, the above processing and the timer field can be omitted.

As described above, according to the present embodiment, it is possible to improve the processing efficiency of the address filter processing and to reduce the physical quantity of hardware.

In each of the embodiments explained above, description has been made of the case where the storage circuit is used for the data base. However, the storage circuit relating to the present invention can also be generally applied to the other image processings described above.

In the above embodiments, the address generation is carried out by the hash method. However, the address generation may be carried out by a method which is suitable for processing in accordance with processing using the storage circuit. Further, the configuration of the data fields and the functions to be realized may be suitably decided in accordance with the processing using the storage circuit.

According to each of the above-described embodiments, it is possible to carry out data processing of the data base in one cycle by making only one access to the memory element thereby to speed processing. Further, the processing speed can be increased by realizing the storage circuit in one chip.

As described above, according to the present invention, it is possible to provide a storage circuit which can execute a high-speed processing of data retrieval/registration, etc.

In other words, according to the storage circuit relating to the present invention, data is read from the address generated by the address generation section for the data inputted from the outside. Based on this data, the comparison section decides a data generation mode for the data to be written in the memory in place of the data read from the memory. Based on the result of this decision, the data processing section generates the data to be written and writes the data in the memory.

Until one of predetermined conditions for the relationship between the inputted data and the read data is met, data is sequentially read from the memory in accordance with a predetermined rule and the above data generation and writing are repeated.

As described above, according to the storage circuit relating to the present invention, the retrieval processing and the registration processing can be realized at a high speed by the hardware in the data base unit or the like. Further, under predetermined conditions in the image processing or the like, it is possible to carry out a high-speed processing to obtain new data by operating inputted data to image data stored in the memory.

Further, it is also possible to increase the speed of processing by arranging the above so that the memory is a dynamic random access memory having a read modify write mode and that the reading of data from the memory into the address that has been read and the writing of data generated by the data processing section are executed in the read modify write cycle in one cycle.

Further, it is possible to realize a further high-speed processing by arranging the above so that the dynamic random access memory has a high speed page mode, the address generation section generates a row address and a column address of the dynamic random access memory for the first address into which data is to be read to compare with the data inputted from the outside and generates only a column address for the second address and the subsequent addresses into which the above data is sequentially generated and that the reading of data from the memory and writing of data generated by the data processing section into the read address are executed in the high speed page mode.

Further, in the case where the above storage circuit is used as a data base, it is possible to carry out the retrieval and registration processings efficiently by employing the hash method to the data having an input of address generation.

Further, according to the data retrieval and registration method relating to the present invention, data retrieval and registration are carried out by the hash method. Since the hash function is hn=h1+n (where n denotes a number of hash times), it is possible to carry out retrieval and registration of the memory data in the dynamic random access memory in the high speed page mode read modify write mode.

Further, according to the storage circuit IC relating to the present invention, the storage circuit is integrated so that there are advantages of high speed, high loading density, easy utilization, etc.

Therefore, according to the bridge unit relating to the present invention, since this storage circuit IC is used as the address data base, it is possible to carry out a high speed address filter processing and to have a compact structure of the storage circuit IC.

We claim:

1. An address filter unit for carrying out an address filter processing between a plurality of networks by using address information extracted from an incoming information frame and registered in an entry table, said address filter unit comprising:
   timers corresponding to each registration of address information; timer updating means for sequentially and intermittently advancing each timer value; starting means for starting said timer updating means at a predetermined cycle $\Delta T$, wherein said timer updating means intermittently advances each timer value at a time interval $\Delta t$, where $\Delta t$ is less than or equal to $\Delta T$ divided by a maximum registration number in the entry table; and means for deleting the registration from said entry table of address information corresponding to said timers when its corresponding timer value becomes equal to or greater than a predetermined value.

2. An address filter unit according to claim 1 further comprising data format conversion means for converting the data format of an information frame to be relayed to other network as a result of an address filter processing by said address filter unit into a data format of the network to which the information frame is relayed.

3. An address filter unit according to claim 1 for connecting branch LANS and a trunk network comprising N (N≧1) logical transmission paths or physical transmission paths further comprising:
   reassemble means for converting the data format of an information frame to be relayed to branch LANs from the trunk network as a result of an address filter processing by said address filter unit into a data format of the branch LANs to which the information frame is relayed, and segmenting means for converting the data format of an information frame to be relayed to the trunk network from the branch LANs as a result of an address filter processing into a data format of the trunk network to which the information frame is relayed; and
   a branch LAN control section for controlling the interface with the branch LANs.

4. A bridge unit comprising:
   a relay unit including an address filter unit according to claim 1, for connecting branch LANs and a trunk network comprising N (N≧1) logical transmission paths or physical transmission paths, and reassemble means for converting the data format of an information frame to be relayed to branch LANs from the trunk network as a result of an address filter processing by said address filter unit into a data format of the branch LANs to which the information frame is relayed, and segmenting means for converting the data format of an information frame to be relayed to the trunk network from the branch LANs as a result of an address filter processing into a data format of the trunk network to which the information frame is relayed; and
   a branch LAN control section for controlling the interface with the branch LANs.

5. An address filtering method for carrying out an address filter processing between a plurality of networks by using address information extracted from an incoming information frame registered in an entry table, said address filtering method comprising:
   a first step for sequentially generating an address of said entry table as a function (fi(a), i=1 to n) of a source address extracted from an incoming information frame at the time of registration in the entry table or a destination address, where (a) is the source address or the destination address, extracted from an incoming information frame at the time of retrieval from the entry table;
   a second step for deciding whether information can be registered in the address generated in the first step in the entry table at the time of registration; and
   a third step for deciding whether address information registered in the address generated in the first step in the entry table is desired information at the time of retrieval wherein the first step, the second step or the third step are pipe-line operated.

6. An address filter unit according to claim 5 further comprising data format conversion means for converting the data format of an information frame to be relayed to other network as a result of an address filter processing by said address filter unit into a data format of the network to which the information frame is relayed.

7. An address filter unit according to claim 5 for connecting branch LANs and a trunk network comprising N (N≧1) logical transmission paths or physical transmission paths further comprising:

reassemble means for converting the data format of an information frame to be relayed to branch LANs from the trunk network as a result of an address filter processing by said address filter unit into a data format of the branch LANs to which the information frame is relayed, and segmenting means for converting the data format of an information frame to be relayed to the trunk network from the branch LANs as a result of an address filter processing into a data format of the trunk network to which the information frame is relayed; and a branch LAN control section for controlling the interface with the branch LANs.

8. An address filtering method for carrying out an address filter processing between a plurality of networks by using address information extracted from an incoming information frame registered in an entry table, said address filtering method comprising:

a first step for sequentially generating an address of said entry table as a function (fi(a), i=1 to n) of a source address extracted from an incoming information frame at the time of registration in the entry table or a destination address, where (a) is the source address or the destination address, extracted from an incoming information frame at the time of retrieval from the entry table;

a second step for deciding whether information can be registered in the address generated in the first step in the entry table at the time of registration; and a third step for deciding whether address information registered in the address generated in the first step in the entry table is desired information at the time of retrieval wherein at the time of a retrieval when it has been decided in the third step that the address information registered in the address fi(a) of the entry table is desired information, the retrieval is finished, and when it has been decided that the address information registered in the address fi(a) of the entry able is not desired information, the retrieval of the address $f_{i+1}(a)$ of the entry table generated in the first step is continued.

9. An address filter unit according to claim 8 further comprising data format conversion means for converting the data format of an information frame to be relayed to other network as a result of an address filter processing by said address filter unit into a data format of the network to which the information frame is relayed.

10. An address filter unit according to claim 8 and further comprising reassemble means for converting the data format of an information frame to be relayed to branch LANs from the trunk network as a result of an address filter processing by said address filter unit into a data format of the branch LANs to which the information frame is relayed, and segmenting means for converting the data format of an information frame to be relayed to the trunk network from the branch LANs as a result of an address filter processing into a data format of the trunk network to which the information frame is relayed; and a branch LAN control section for controlling the interface with the branch LANs.

11. An address filter unit for carrying out an address filter processing between branch LANs and N trunk networks, where N≧1, comprising logical transmission paths or physical transmission paths by retrieving address information extracted from an incoming information frame registered in an entry table, said address filter unit comprising:

priority order decision means for deciding priority order of registration of address information incoming from the branch LANs into the entry table, registration of address information incoming from the N transmission paths of the trunk network into the entry table, and retrieval of address information from the entry table; and execution means for executing the processing in accordance with the result of a decision.

12. An address filter unit according to claim 11, wherein said priority order is in the order of retrieval of address information from the entry table, registration of address information incoming from said branch LANs into the entry table and registration of address information incoming from said trunk network into the entry table.

13. An address filter unit according to claim 12 further comprising data format conversion means for converting the data format of an information frame to be relayed to other network as a result of an address filter processing by said address filter unit into a data format of the network to which the information frame is relayed.

14. An address filter unit according to claim 12 and further comprising:

reassemble means for converting the data format of an information frame to be relayed to branch LANs from the trunk network as ar result of an address filter processing by said address filter unit into a data format of the branch LANs to which the information frame is relayed, and segmenting means for converting the data format of an information frame to be relayed to the trunk network from the branch LANs as a result of an address filter processing into a data format of the trunk network to which the information frame is relayed; and a branch LAN control section for controlling the interface with the branch LANs.

15. An address filter unit according to claim 11, wherein said address filter unit includes storage means for temporarily storing address information incoming from said trunk network; and said execution means registers address information stored in the storage means in the entry table during a period when other processings are not being carried out.

16. An address filter unit according to claim 15 further comprising data format conversion means for converting the data format of an information frame to be relayed to other network as a result of an address filter processing by said address filter unit into a data format of the network to which the information frame is relayed.

17. An address filter unit according to claim 15 and further comprising:

reassemble means for converting the data format of an information frame to be relayed to branch LANs from the trunk network as ar result of an address filter processing by said address filter unit into a data format of the branch LANs to which the information frame is relayed, and segmenting means for converting the data format of an information frame to be relayed to the trunk network from the branch LANs as a result of an address filter processing into a data format of the trunk network to which the information frame is relayed; and a branch LAN control section for controlling the interface with the branch LANs.

18. An address filter unit according to claim 11 further comprising data format conversion means for converting the data format of an information frame to be relayed to other network as a result of an address filter processing by said address filter unit into a data format of the network to which the information frame is relayed.

19. An address filter unit according to claim 11 further comprising:

reassemble means for converting the data format of an information frame to be relayed to branch LANs from the trunk network as ar result of an address filter processing by said address filter unit into a data format of the branch LANs to which the information frame is relayed, and segmenting means for converting the data format of an information frame to be relayed to the trunk network from the branch LANs as a result of an address filter processing into a data format of the trunk network to which the information frame is relayed; and a branch LAN control section for controlling the interface with the branch LANs.

20. An address filter unit for carrying out an address filter processing between branch LANs and N trunk networks, where $N \geq 1$, comprising logical transmission paths or physical transmission paths by retrieving address information extracted from an incoming information frame registered in an entry table, said address filter unit comprising:

priority order decision means for deciding priority order of executing registration of address information incoming from the N transmission paths of the trunk network into the entry table, and retrieval of address information from the entry table;

address generation means for sequentially generating an address of the entry table as a function ($f_i(a)$, $i=1$ to n) of a source address extracted from an incoming information frame at the time of registration in the entry table or a destination address (where (a) is the source address or the destination address) extracted from an incoming information frame at the time of retrieval from the entry table;

registration address candidate decision means for choosing a registration address from among addresses sequentially generated by said address generation means in the entry table at the time of registration;

retrieval means for retrieving desired address information from among addresses generated by said address generation means in the entry table at the time of retrieval; and means for parallel processing the address generating processing for generating an i-th address by said address generating means, the retrieval processing for retrieving an $(i-1)$th address by said retrieval means or the decision processing for deciding an $(i-1)$th address by said registration address candidate decision means.

21. An address filter for connecting branch LANs and a trunk network comprising N ($N \geq 1$) logical transmission paths or physical transmission paths comprising: reassemble means for converting a data format of an information frame to be relayed to branch LANs from the trunk network as a result of an address filter processing into a data format of the branch LANs to which the information frame is relayed; segmenting means for converting the data format of an information frame to be relayed to the trunk network from the branch LANs as a result of an address filter processing into a data format of the trunk network to which the information frame is relayed;

a branch LAN control section for controlling the interface with the branch LANs, wherein said address filter unit extracts address information from an information frame on branch LANs, an information frame transmitted to its own bridge on the trunk network and an information frame transmitted to another bridge unit other than an information frame relayed to the trunk network at least by own bridge unit in the trunk network, and registers the address information in the entry table.

* * * * *

UNITED STATES PATENT AND TRADEMARK OFFICE
CERTIFICATE OF CORRECTION

PATENT NO. : 5,210,748
DATED : May 11, 1993
INVENTOR(S) : Katsuyoshi Onishi, et al.

It is certified that error appears in the above-identified patent and that said Letters Patent is hereby corrected as shown below:

Claim 14, column 26, line 39, delete "ar" and substitute therefor --a--.

Claim 17, column 27, line 1, delete "ar" and substitute therefor --a--.

Claim 19, column 27, line 24, delete "ar" and substitute therefor --a--.

Claim 20, column 28, line 18, delete "generating" and substitute therefor --generation--.

Claim 20, column 28, line 20, delete "generating" and substitute therefor --generation--.

Signed and Sealed this

First Day of February, 1994

Attest:

BRUCE LEHMAN

*Attesting Officer*  *Commissioner of Patents and Trademarks*